(12) United States Patent
Maigne et al.

(10) Patent No.: US 8,996,864 B2
(45) Date of Patent: Mar. 31, 2015

(54) SYSTEM FOR ENABLING MULTIPLE EXECUTION ENVIRONMENTS TO SHARE A DEVICE

(75) Inventors: Gilles Maigne, Montigny-le-Bretonneux (FR); Vladimir Grouzdev, Montigny-le-Bretonneux (FR); Michel Gien, Montigny-le-Bretonneux (FR); Christian Jacquemot, Montigny-le-Bretonneux (FR)

(73) Assignee: Virtuallogix SA (FR)

( * ) Notice: Subject to any disclaimer, the term of this patent is extended or adjusted under 35 U.S.C. 154(b) by 1096 days.

(21) Appl. No.: 12/520,301

(22) PCT Filed: Dec. 21, 2007

(86) PCT No.: PCT/EP2007/011383
§ 371 (c)(1),
(2), (4) Date: Oct. 14, 2009

(87) PCT Pub. No.: WO2008/077628
PCT Pub. Date: Jul. 3, 2008

(65) Prior Publication Data
US 2010/0031325 A1    Feb. 4, 2010

(30) Foreign Application Priority Data

Dec. 22, 2006    (EP) .................................. 06292042

(51) Int. Cl.
| G06F 21/71 | (2013.01) |
| G06F 9/455 | (2006.01) |
| G06F 21/53 | (2013.01) |
| H04L 29/06 | (2006.01) |
| G06F 21/12 | (2013.01) |

(52) U.S. Cl.
CPC ............. *G06F 9/45533* (2013.01); *H04L 63/10* (2013.01); *G06F 21/53* (2013.01); *G06F 21/121* (2013.01)
USPC ................................................ 713/164; 726/4

(58) Field of Classification Search
CPC ............................ G06F 21/53; G06F 9/45533
See application file for complete search history.

(56) References Cited

U.S. PATENT DOCUMENTS

| 7,096,473 | B2 * | 8/2006 | Ruget et al. .................... 719/321 |
| 7,124,228 | B2 * | 10/2006 | Grouzdev ...................... 710/306 |
| 7,546,398 | B2 * | 6/2009 | Corneli et al. .................. 710/38 |
| 7,672,299 | B2 * | 3/2010 | Droux et al. ................... 370/359 |
| 7,900,005 | B2 * | 3/2011 | Kotsovinos et al. .......... 711/162 |

(Continued)

*Primary Examiner* — Michael R Vaughan
(74) *Attorney, Agent, or Firm* — Beem Patent Law Firm

(57) ABSTRACT

According to the present invention, there is provided a data processing system comprising: a dedicated physical device for access by a single client only; a shared physical device for shared access by multiple clients; a partition of a first type associated with the dedicated physical device, the first type partition comprising said single client and a first device driver for accessing the dedicated physical device; a partition of a second type associated with the shared physical device, the second type partition comprising a second device driver for accessing the shared physical device, and a back end driver for accessing the second device driver; and multiple partitions of the third type each comprising a respective one of said multiple clients and a front end driver for accessing the shared physical device via the second type partition. There is also provided a method of operating the data processing system comprising: executing a user application in the standard domain; and executing in the trusted domain, one or more predetermined operations, services and/or functions relating to the user application.

30 Claims, 25 Drawing Sheets

(56) References Cited

U.S. PATENT DOCUMENTS

| | | | |
|---|---|---|---|
| 8,027,472 B2* | 9/2011 | Aissi et al. | 380/249 |
| 8,091,084 B1* | 1/2012 | Dobrovolskiy et al. | 717/174 |
| 8,107,927 B2* | 1/2012 | Sivaram et al. | 455/411 |
| 8,146,079 B2* | 3/2012 | Gupta et al. | 718/1 |
| 8,185,893 B2* | 5/2012 | Hyser et al. | 718/1 |
| 8,191,069 B2* | 5/2012 | Watanabe et al. | 718/104 |
| 2005/0114687 A1* | 5/2005 | Zimmer et al. | 713/193 |
| 2006/0123416 A1* | 6/2006 | Cibrario Bertolotti et al. | 718/1 |
| 2006/0129496 A1* | 6/2006 | Chow et al. | 705/59 |
| 2006/0146057 A1* | 7/2006 | Blythe | 345/506 |
| 2006/0200821 A1* | 9/2006 | Cherkasova et al. | 718/1 |
| 2006/0236127 A1* | 10/2006 | Kurien et al. | 713/193 |
| 2007/0079120 A1* | 4/2007 | Bade et al. | 713/166 |
| 2007/0234412 A1* | 10/2007 | Smith et al. | 726/11 |
| 2008/0005791 A1* | 1/2008 | Gupta et al. | 726/15 |
| 2008/0080512 A1* | 4/2008 | Gofman et al. | 370/392 |
| 2009/0307770 A1* | 12/2009 | Harris et al. | 726/22 |
| 2010/0031325 A1* | 2/2010 | Maigne et al. | 726/4 |
| 2010/0088757 A1* | 4/2010 | Grouzdev et al. | 726/15 |

* cited by examiner

SYSTEM FOR ENABLING MULTIPLE EXECUTION ENVIRONMENTS TO SHARE A DEVICE

CROSS-REFERENCE TO RELATED APPLICATIONS

This application is a U.S. national stage application of PCT application PCT/EP07/011383, filed Dec. 21, 2007, and claims the benefit of priority from EP Patent Application 06292042.6, filed Dec. 22, 2006.

BACKGROUND OF THE INVENTION

1. Field of the Invention

The present invention relates to a system for enabling multiple execution environments to share a single data processing system.

2. Description of the Related Art

General Requirements for Multiple Execution Environments

The software required by new generations of connected devices and other embedded systems as well as modern network processing or data processing equipment is a combination of several execution environments, each dedicated to provide specific services. Typical examples of such combinations are (1) legacy custom environments or real-time operating systems supporting demanding real-time tasks (RTOS) and standard, open, and rich environments such as Linux or Windows supporting a wide range of applications (Rich OS), (2) Trusted Execution Environment (TEE) performing security critical tasks and general purpose environment open to attacks from a network (Open OS) or other input peripherals, or (3) Device Management (DM) environment controlling the provisioning, fault detection and recovery, code integrity, software upgrade, etc; of a separate application execution environment supported by an open operating system (Open/Rich OS).

Approaches to Consolidating Multiple Execution Environments

One approach to consolidate several execution environments is to provide each with its own dedicated hardware. Each environment then runs independently on its own dedicated processor and associated hardware. This approach requires little or no software modification, guarantees that software running in one environment are isolated from software running in the other, ensures that real time applications run on their own real-time OS, and each accesses the private resources it needs to operate correctly. Traditionally, these environments communicate through a stack of software protocols on top of a physical link—such as a serial line, a bus or dual access memory—that connects the independent hardware blocks.

Such an approach seems attractive because:

It requires "only" an additional processor, some extra memory and possibly a few extra I/O devices. The resulting design is somewhat modular in that products with fewer features may be derived from current ones, without the additional processor.

Software integration and validation are straightforward because the environments operate separately. Software can be developed at low cost and in a timely fashion.

However, this approach has some major drawbacks:

It requires a complex board design. Time saved on the software development cycle may be lost in the hardware design.

An additional processor on a board implies a more expensive Bill of Materials (BoM). Device unit cost is also impacted by the requirement to deploy additional memory or perhaps some dual-ported memory, and various devices may need to be duplicated since accessing them from two independent processors may be too complex.

More processing power, devices and memory implies a bigger and heavier device, occupying more space and more importantly consuming more power, reducing the "time between charges" of battery powered devices.

Moreover cooperation and interactions between independent hardware/software stacks not only require careful attention, but may be tricky or even, impossible in the case of security or device management when these run on separate hardware than the software they are intended, to secure and/or control.

Instead of hardware extensions, another approach is software integration. This approach involves merging or porting different software environments to run simultaneously on the same processor within a single Operating System (OS).

Most applications use well-defined and quite portable interfaces to inter-operate with the OS. Therefore, applications may be ported from a legacy embedded RTOS to a general purpose environment, or the other way around. Emulation libraries may be created to enable applications from one OS to run on another OS. Security and device management services can be integrated as well within a general purpose or rich operating system.

The advantages of this approach are:

Hardware design is much simpler than that of the hardware extensions approach previously described. Hence, hardware development time is shorter and the Bill of Material is reduced.

Once integrated, all software runs in a single environment, avoiding the burden of multiple environments. Moreover, if the selected environment is a Rich Operating System (RichOS), tracking its evolutions (Internet protocol stacks in particular) is much easier.

Unfortunately, there are many drawbacks to such software integration approach:

Merging different software environments requires a lot of redesign, porting, and validation effort. This increases development costs and Time to Market.

Legacy OS environments are often well adapted to provide real-time guarantees, while RichOS are usually not. The use of emulation libraries may impose timing and performance penalties. RichOS are well adapted for rich file systems or user interface support, but legacy OS are much more restrictive on this point. Hence, no single environment of this kind can simultaneously provide the guarantees and Quality of Service (QoS) required by both sets of applications.

Such an integrated software stack should be configurable so that scaled-down versions may be run on smaller hardware configurations where RichOS applications and services may not be all necessary.

The availability, reliability and security of the whole system depend on a single execution environment that acts as a single point of failure. If it is provided by an open and rich—therefore complex—Operating System environment it will be impossible to fully validate, evaluate and certify the system from an availability, reliability, and security standpoint.

Use Case Examples Illustrating Problems Addressed by the Invention Operating System Consolidation For example, in the field of mobile communications, conventional mobile telephones are built today around a so-called baseband processor (or modem) running a Real Time Operating System (RTOS) that supports the upper layers of wireless protocol stacks, basic telephony applications and an application framework for higher level applications. On the other hand, high-end smartphones are based on several processors (an application processor and a modem) and their associated hardware and run a RTOS on the modem supporting wireless protocol stacks and an open rich operating system (Rich OS) on the application processor. Being able to make the RTOS and the Rich OS share a single processor—combining the roles of the application and baseband processors—would allow to bring smartphones high-end services into mass market conventional handsets.

In the field of network infrastructure equipment, legacy, often real-time operating systems do not support modern multi-core processors and large 64-bit addressable memory spaces. It would take considerable amount of time and effort and in most cases a complete re-design to adapt them to such new hardware capabilities. Considerable investments have been put over the years into the applications that depend on such legacy operating environments and that are today completely validated, stable and fully operational. Porting them to a new operating environment such as provided by modern operating systems supporting such new hardware capabilities is a major investment with lots of risks attached. Being able to consolidate several instances of such legacy operating systems and application stacks on multi-core hardware platform with no changes in existing software stacks would eliminate these otherwise required investments and risks, while still take full benefit of modern hardware capabilities.

Security Management

In the field of security management, rich and open software operating in a network environment are subject to attacks that take advantage of code errors, design flaws or any failures that it is impossible to avoid in any piece of large and complex software. Being able to (1) isolate the open environment and confine the potential impact of a "malware" attack, (2) execute critical data manipulation and security related software in closed or trusted execution environments, and (3) monitor and control the integrity and behaviour of the above, all from an independent trusted piece of software would be a major step forward in providing trust into such devices to each of its asset owners, i.e., end users—enterprise and consumers—content providers, operators, manufacturers and software developers.

An example is where "closed" or "trusted" execution environments are arranged to perform "critical" or "trusted" applications, while an Open OS is provided to perform "non-critical" or "non-trusted" applications, "Critical" applications include the "core services" of a mobile telephone (e.g., voice calls, SMS, address book), "trusted" applications include security agents and device platform management tasks. Security and device management agents provide various tasks related to provisioning, booting, authentication, access control, SIM-locking, filtering, decryption, auditing, logging, upgrading, etc. Non-trusted applications generally include multimedia applications, such as the downloading of audio and video data (music, films), games, or internet applications in general. Examples of Open OSs are Windows, Linux and Symbian.

One of the problems associated with Open OSs is that their software is too large and too complex to be trusted when operating in a network environment that is fundamentally "hostile" and where "malware" cannot be avoided.

For example, Open OSs are not well suited to implement trusted digital rights management (DRM). DRM refers to technologies used to enforce pre-defined policies controlling access to software, music, movies, or other digital data, in particular copy protection.

An Open OS that controls all device resources, including network access and storage provides for the downloading, decryption and display of digital data subject to DRM. Thereafter, the Open OS cannot forbid unrestricted access to the DRM protected digital data in a way that can be trusted because there is high risk that some "malware" will be able to circumvent the Open OS protection schemes at some point in time. At this stage, the user may now be able to store and/or distribute the digital data no longer subject to any restrictions. Another example of a problem associated with open software of mobile handsets is the limited protection of the user from "malware" applications that send text messages (SMS) or initiate any other operation involving a charging fee without him or her being aware of. To avoid such situations, one would like to prompt the user for authorizing operations that induce charging fees. But how to insure that "malware" cannot bypass the user prompting sequence.

Another example is related to input/output of user sensitive data such as a credit card number, PIN code, user identification, password, biometric data, etc, on an input/output peripheral that is under the control of an "un-trusted" open execution environment. How can the user trust that the "prompting" message that invites him or her to input his or her secret code has not been forged by "malware", and that once input, the "secret code" is going to be securely protected against unauthorized access.

Another example is related to filtering software installed in a device to examine and reject all data entering a device from a network, or going out to the network from the device, that is suspected of carrying "malware", such as unauthorized access, viruses, worms, Trojan horses, spam, unwanted content, etc. This is sometimes referred to as "Firewall" or "Internet Security" software. How can one trust that such "protecting" software is itself protected against "malware" attacks when it runs within an "un-trusted" open environment.

All these examples and many others not described here boil down to the following question: How can one minimize the amount of "trusted code" required in a device and still guarantee an overall trusted behaviour, while leveraging untrusted complex and rich open software, in an hostile open network environment.

Device Platform Management and High Availability

Device Platform Management implements the system services that control the operating environment for user level applications and services. It provides services such as software provisioning, secure booting, authentication, access control, monitoring, auditing, logging, system software upgrades, communication with remote management servers, etc. It should also make sure that the operating environment is continuously and properly operating, and take prompt recovery actions (such as automatically restarting it) in case of failure. One fundamental characteristic of these services is that they are required to be in operation even when the main operating system is corrupted or not operational. In fact, their primary role is to take control when the operating environment fails and put it back into operation with minimum user level service interruption. Its role is also to monitor the behaviour of the operating environment to guarantee its integrity, and proper functioning.

The present invention is concerned with what software architecture and internal methods are needed to be implemented to support such device management software so it can properly control the operating environment supporting user level applications and services.

More generally, it is an object of the present invention to address the above problems.

BRIEF SUMMARY OF THE INVENTION

The invention is recited by claim 1. Preferred features are recited by the dependent claims.

According to the invention, there is provided a data processing system comprising: a dedicated physical device for access by a single client only; a shared physical device for shared access by multiple clients; a partition of a first type associated with the dedicated physical device, the first type partition comprising said single client and a first device driver for accessing the dedicated physical device; a partition of a second type associated with the shared physical device, the second type partition comprising a second device driver for accessing the shared physical device, and a back end driver for accessing the second device driver; and multiple partitions of the third type each comprising a respective one of said multiple clients and a front end driver for accessing the shared physical device via the second type partition.

According to the invention, there is also provided a method of operating the data processing system comprising: executing a user application in the standard domain; and executing in the trusted domain, one or more predetermined operations, services and/or functions relating to the user application.

Accordingly, embodiments of the present invention may be applied to two classes of devices. The first class is a non-shared device. The second class of device is a shared device. The back end driver is responsible for providing shared access to the shared devices. One advantage of using a back end driver for providing access to the shared devices is that the native device driver does not have to be rewritten.

The back end driver "exposes" an image of a virtual device representing an image of the actual device. The client accesses the virtual device through the front end driver. The physical device is "multiplexed" between several virtual devices, one for each client. This multiplexing is implemented by the back end driver. Each front end driver provides access to a back end driver.

Hyper visors are known. They normally implement partitioning as well as sharing and isolation between partitions. According to an embodiment of the present invention, sharing and isolation are separated and associated with different partitions. In particular, the virtual device and the isolator are associated with the third type of partition.

BRIEF DESCRIPTION OF DRAWINGS

Embodiments of the invention will now be described, by way of examples only, with reference to the accompanying drawings, in which.

DETAILED DESCRIPTION OF THE INVENTION

Definitions

Figure 1:
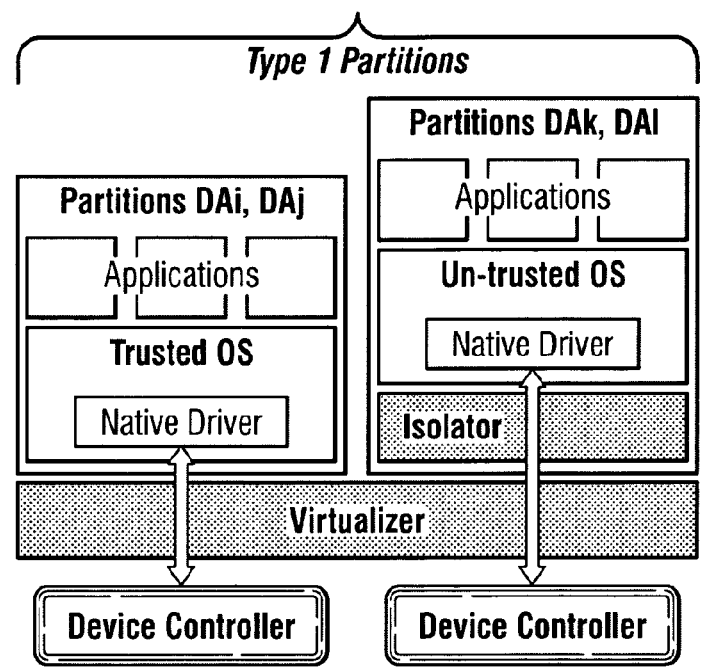
FIGS. 1 to 4 are schematic block diagrams illustrating the partitioning of a hardware platform of a data processing system according to embodiments of the invention.

Execution Environment: Hardware and/or software for providing the environment in which applications and/or services can be executed. Examples: operating systems, device drivers.

Partition: Subset of hardware resources of a data processing system, which subset is allocated to an Execution Environment.

Virtualizer: Allocates hardware resources of the data processing system to different Partitions.

Isolator: Software that prevents communications between Partitions except through Virtual Devices, thereby isolating Partitions from one another.

Virtual Device: An "image" of an actual physical device.
Trusted Executive: Execution environment for executing trusted services.

Such Executive provides services such as, scheduling, synchronization, timers, memory management, to support security-related tasks, etc.

Introduction

Real-Time Virtualization Technology

An embodiment of the present invention provides real-time virtualization technology which enables multiple Execution Environments to run simultaneously on the same single-core or multi-core processor or sets of processors in Symmetric Multiprocessing (SMP) configurations. These Execution Environments are independent from each other, but can cooperate via efficient communication mechanisms. Execution Environments that are running complete operating systems, including user level services and applications are usually referred to as guest OSs.

Virtualization as such in the IT server space is known. However, the architecture and design choices required in the embedded and real-time environment have led to a different design approach.

As shown, for example, in FIGS. 1-4, a thin abstraction layer (the virtualizer) manages key system resources that it allocates to Execution Environments from the underlying hardware. More precisely, the virtualization technology of an embodiment of the invention relies primarily on partitioning of resources between Execution Environments and on virtualization of resources which are not partitioned.

Typically, physical memory is partitioned between the Execution Environments while a single CPU, FPU, MMU or some other system parts such as the real-time clock and interrupt controller are virtualized.

This approach allows Execution Environments to range from being as simple as what is required to run a single device driver in several Kbytes of memory, to a Real-Time Operating System (RTOS) with deterministic behavior, to complete general purpose guest OS. Such a design approach enables the virtualization technology to be applied to embedded and real-time systems.

Partitioning

A partition is a subset of data processing system hardware resources allocated to an Execution Environment wherein there is no overlap in resources allocated to two partitions. Two partitions may be allocated memory from a common memory chip such that the ranges of physical memory addresses directly accessible to each do not overlap. One partition may indirectly control memory of a second partition, but only by commanding a process of the second partition to directly operate on the memory.

Figure 2:
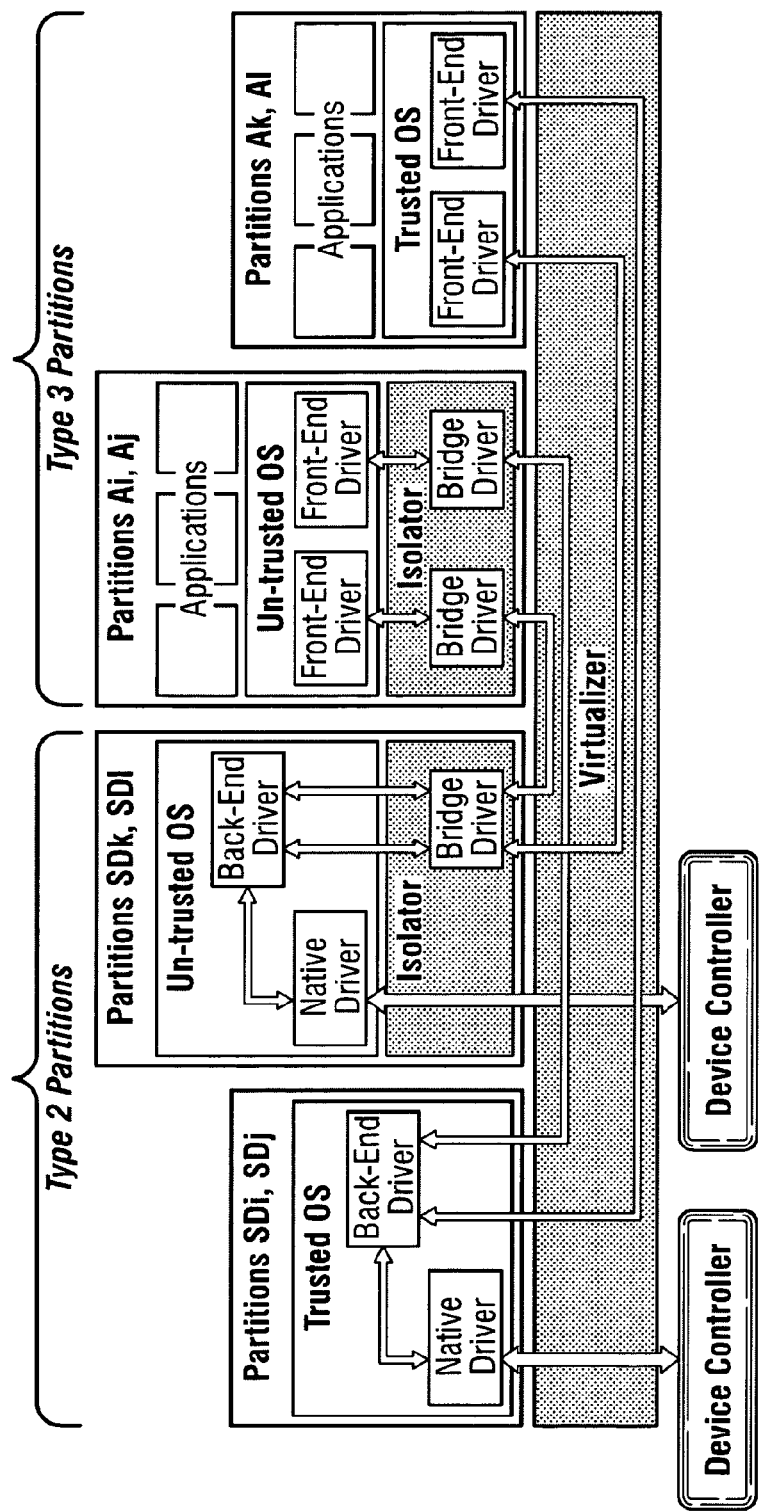

FIGS. 1 and 2 illustrate three types of partitions. Partitions of the first type comprise clients (applications) and native drivers for accessing dedicated physical devices. Thus, in partitions of the first type, access to peripheral devices is dedicated to applications in the same partitions.

Partitions of the second and third types provide shared access to peripheral devices. Partitions of the second type comprise the device server, whereas partitions of the third type comprise the device client.

Figure 3:
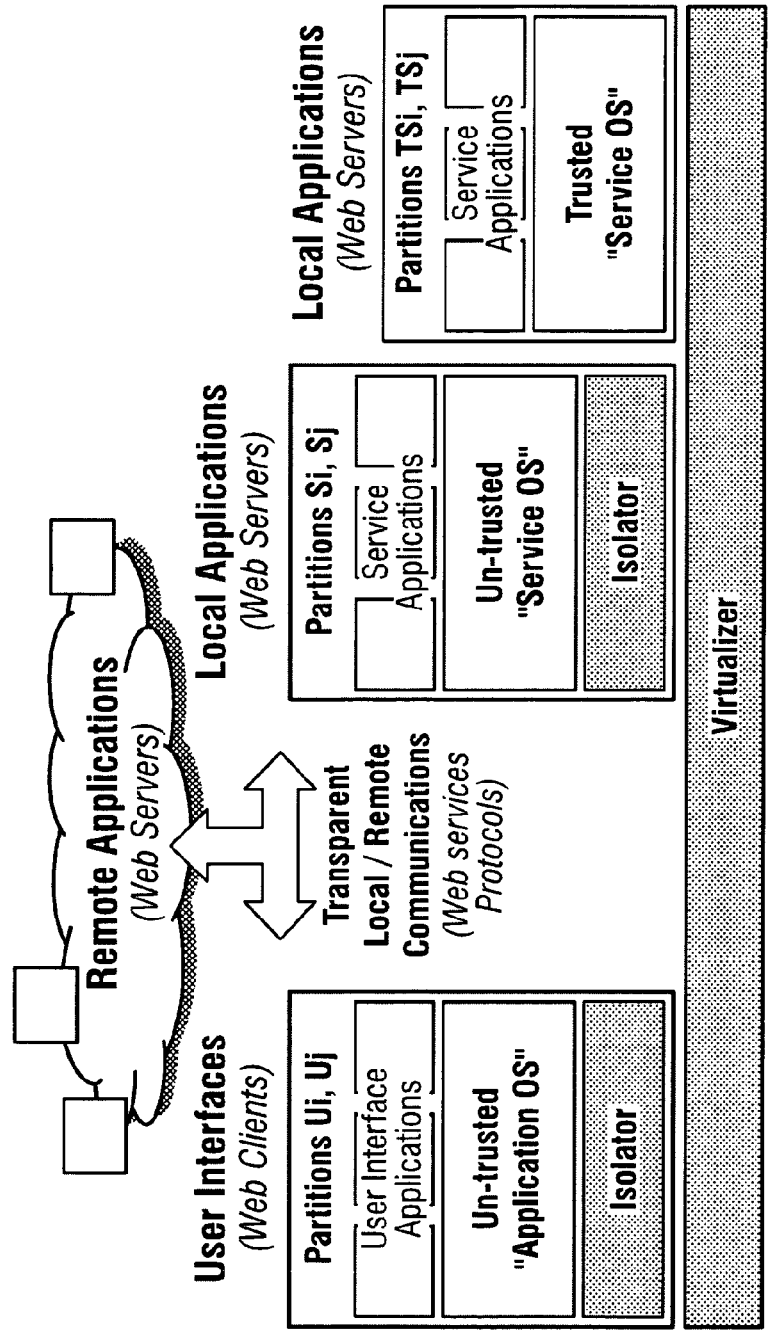

FIG. 3 illustrates schematically interactions between one or more user interface(s) and applications and services so they can be run in different partitions (on different OSes, trusted or un-trusted) and interact by means of the Internet Web Services Protocols, according to an embodiment of the invention. This embodiment allows to make no distinction between services local to the device and remote services accessed through the network. It provides complete flexibility for the device manufacturer to decide where to run device services locally on the device (off-line mode), or remotely on a network server (on-line mode), or both (Intermittent on/offline mode). This allows to use the same User Interface and SW architecture for "light weight", low cost devices where only the UI is local and the applications remotely accessed (but which need to be always connected) and more "heavy weight", expensive but more autonomous devices that run all their applications locally.

Figure 4:
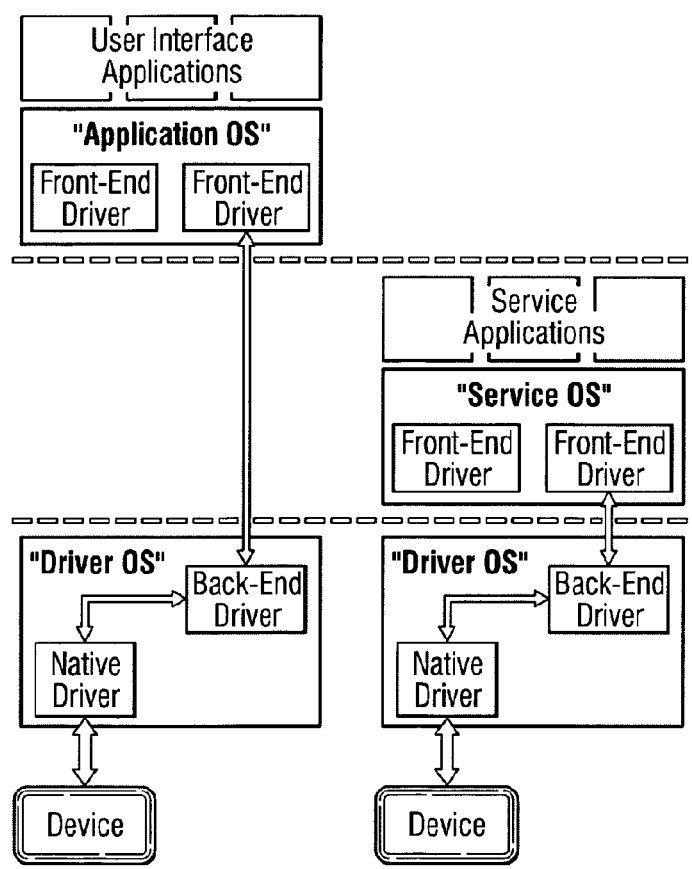

FIG. 4 illustrates schematically the arrangement of and interaction between user interface partitions, service/application partitions, and shared device access partitions.

Isolation and Security

Some software configurations and applications may require stronger isolation than the isolation provided by simple partitioning of the data processing system hardware, for example to protect partitions containing "trusted" software from partitions running "un-trusted" software that could be exposed to internal or external threats. To this end, optional isolator modules leverage underlying hardware-controlled resources—such as provided by a Memory Management Unit for example—to provide hardware-controlled isolation between partitions.

Isolation is not security in itself, but a prerequisite to the creation of a secure system. The virtualization technology according to an embodiment of the invention enables the full isolation of un-trusted Execution Environments that are made to run in sandboxed partitions by the isolator module. Trusted Execution Environments can be configured to let trusted agents manage the core security services of the platform. Such trusted agents may be configured and used as required by the overall system, either to run DRM policies, to store keys or to perform the management of multilevel security platforms.

The virtualization technology has been designed along a modular architecture that allows developers to make explicit trade-offs between required levels of isolation and desired levels of performance.

Partitioning and Isolation may be used to isolate the secure, trusted zone or environment from a set of non-trusted, open or close, standard or proprietary zones or environments. The trusted zone is formed by that part of the hardware and/or software architecture of a data processing device in which core services, implemented as trusted software, are executed, such as the virtualization software itself, control programs, security agents, management agents, etc, and may comprise a Trusted (real time) Executive. The trusted zone may be embedded in persistent memory of the device. Open zones are formed by that part of the hardware and/or software architecture of the device in which operating systems (guest OSs) operate to execute services and applications, such as the downloading of data or the provision of interactive user services. Both the open zones and the trusted zone may share a single processor.

Predetermined operations of an application running in an open zone may be transferred to the other side of the partition, i.e. into the trusted zone. Thereby, risks, for example security risks, which may be associated with the execution of these operations in the open zone (which may be due to its "open" nature) are eliminated.

Partitioned resources such as memory, which will only be used by a single given Execution Environment, are exclusively owned by that Execution Environment. Thus, each guest OS may use its own native mechanisms and policies, such as memory management, without interfering with other guest OSs.

According to an embodiment of the invention, I/O devices which will be used by a single Execution Environment are assigned to that Execution Environment, thus native device drivers can be re-used without any modification.

Visualization

Core hardware resources that are common to more than one Execution Environment such as the CPU and real-time clock are virtualized so that they can be shared between those Execution Environments that need to access such a resource.

In order to ensure efficiency, para-virtualization techniques may be employed, meaning that some adaptation of the guest OS kernel is done. These changes are comparable in both effort and scope to porting that OS to an hardware very similar to the underlying one. Therefore, adding support for new OSs is straightforward.

According to an embodiment of the invention, the CPU, FPU and MMU (if any) resources are always virtualized. The CPU is shared by means of a scheduler which assigns the processor to the selected Execution Environment based on scheduling policies which guarantee that a real-time guest OS will get a higher priority.

When a guest OS has been granted CPU access, it still uses its own native scheduling algorithms for its applications.

If present, the MMU is virtualized so that each guest OS may use it for its own purposes. Usage of the MMU by one guest OS is independent from the usage of the MMU by another guest OS.

Device Virtualization

Running different OSs simultaneously on the same processor is just one small part of the problem. Running OSs which neither communicate nor share devices or resources would be of little value.

Generally, according to an embodiment of the invention, there is provided an OS environment which supports multiple applications allocates memory to them and provides for application scheduling algorithms.

Also, the virtualization technology according to an embodiment of the invention provides each guest OS with synchronization (cross-interrupt mechanism), shared access to devices such as disk controllers, network interfaces, serial lines and inter-OS communication mechanisms through virtual devices such as virtual Ethernet or virtual UART.

Shared I/O Devices

Devices such as an Ethernet controller, a serial line, or a storage device may need to be accessed by more than a single guest OS. For such standard I/O devices, there are included "back-end" device drivers which manage the physical hardware devices and virtualize the corresponding device, and "front-end" device drivers which export a virtual view of that device to other guest OS. This approach provides these guest OSs with access to features of each "virtual" device without actual access to the physical device.

Access to shared I/O devices is granted to guest OSs according to policies that take into account priorities and/or fairness and avoid Denial of Service (DoS) attacks from one guest OS that could potentially prevent the others to access the shared resource.

Virtual Communication Devices

Communications between the different guest OSs are provided by virtual communication devices. Different types of such devices can be configured depending upon the needs of the communicating applications. For example, a system might use a virtual Ethernet to implement a local private network that is located wholly internally to the machine, and/or it might use virtual UART device to pass AT modem commands from one guest OS to the other.

Modularity, Performance, Footprint

There is no universal unique solution which may adequately solve every product's problems. The virtualization technology according to an embodiment of the invention uses a modular architecture which enables developers to configure a custom product specific virtualization solution that meets the required product-specific trade-offs between footprint, performance, isolation and security.

In particular, a default configuration may give each guest OS its own physical memory, providing enough memory isolation between each of the guest OSs to catch most memory access errors. Such default configuration can be optionally complemented with Isolator modules to provide stronger isolation services on hardware with a MMU.

DETAILED DESCRIPTION OF SPECIFIC EMBODIMENTS

Trusted System Concepts

Conceptually, according to an embodiment of the invention there is provided a multi execution environment on a single hardware platform.

Figure 5:
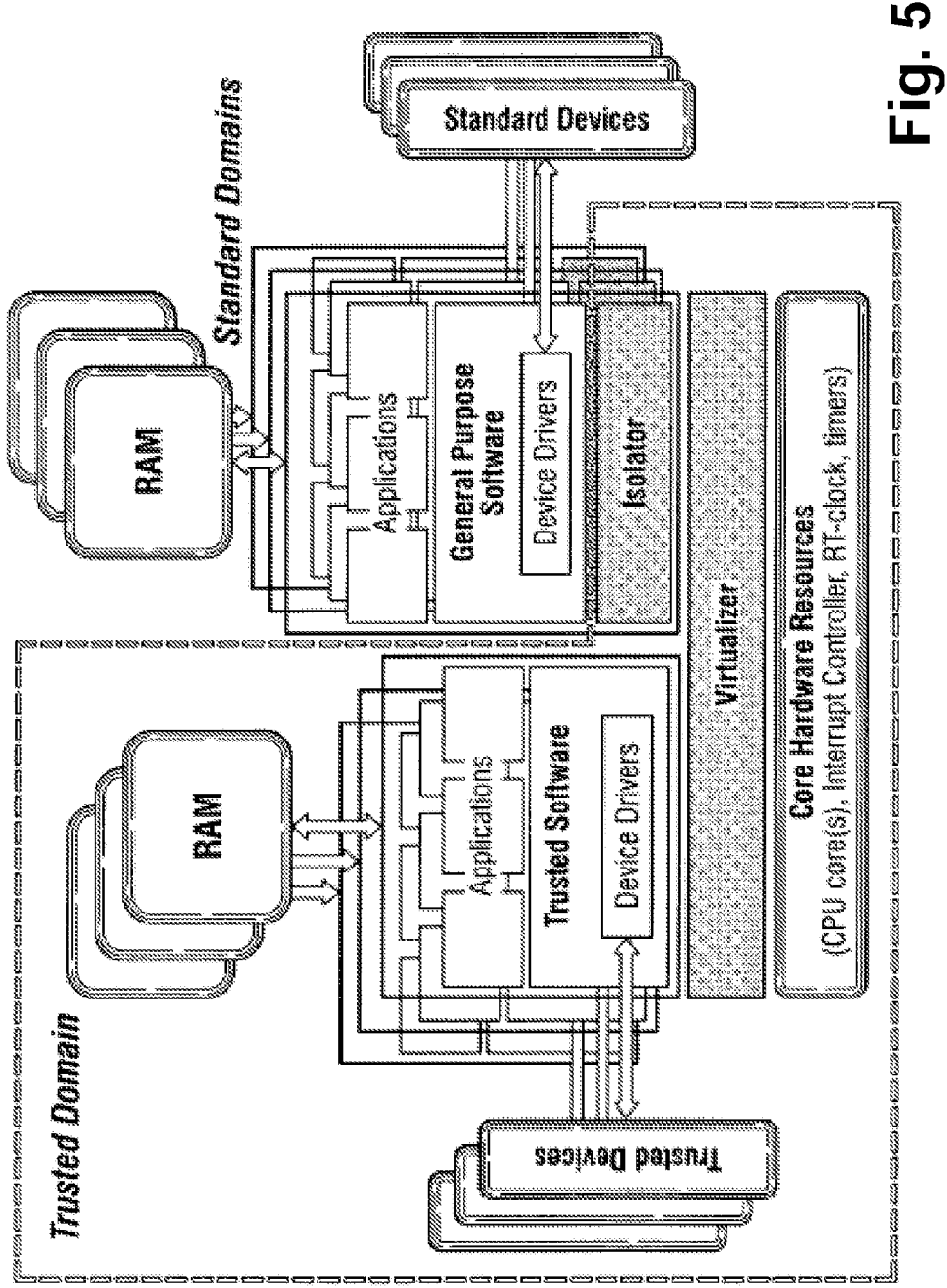
FIG. 5 is a schematic block diagram illustrating the provision of a trusted domain and standard domains in accordance with an embodiment of the invention.

Referring to FIG. 5, the whole platform is logically split in multiple domains (zones). Each "domain" can make use of several "partitions". There is one trusted domain in which trusted (certified) software is executed. In addition, optionally, multiple standard domains can coexist on the same platform. A standard domain is dedicated to run a general purpose (typically non certified) operating system, or any other untrusted software. Any hardware resources available on the platform (e.g., CPU, FPU, MMU, RAM, I/O devices) are exclusively attached to only one domain.

All available hardware resources are split in two categories: static and dynamic. Static resources (like RAM or I/O devices) are typically attached at boot time and their owner is usually never (or rarely) changed over time. On the other hand, dynamic resources (like CPU, FPU and MMU) are attached on demand and therefore alternatively owned by different domains. The trusted software provides an execution environment within each standard domain that is safe for the trusted software itself and for the other standard domains. Software running within such a safe execution environment is unable to compromise the trusted software security, integrity and availability. Moreover, the trusted software provides a mutual protection between different standard domains. In particular, the trusted software guarantees that resources not owned by a given standard domain are not accessible from the standard software running within this domain. In order to provide an inter-domain communication, the trusted software creates virtual devices. Such devices take a part in the safe execution environment. Analogous to hardware I/O devices, virtual devices can be considered as additional resources available to a standard domain. They can be used to communicate between the trusted domain and a standard domain as well as between two standard domains (when it is allowed by the trusted software). For instance, a trusted device owned by the trusted domain (e.g., a hard disk partition) can be made available to a standard domain through a dedicated virtual device (a virtual block device). Another example is a virtual network connecting certain standard domains (e.g., a virtual Ethernet LAN).

In an embodiment, the trusted system design is based on three software components running within the trusted domain:

Virtualizer
Isolator
"Trusted Executive"

A combination of some these components provide the functions of a Virtual Machine Monitor also referred to sometimes as an "Hypervisor".

As seen in FIG. 2, partitions of the second and third types also may include one or more isolators for preventing communications between the secondary partitions and the primary partition except through the virtual device. Each isolator may include one or more bridge drivers for preventing unauthorized access between back end drivers and front end drivers. The isolators preferably are included in partitions with un-trusted OSes, such that the bridge drivers may be used for communications that involve an un-trusted partition, i.e., between trusted and un-trusted or between un-trusted and un-trusted. In one aspect, a bridge driver may be configured to prevent access to a back end driver by a front end driver not authorized to have such access. Additionally or alternatively, a bridge driver may be configured to prevent access by at least one of the device driver and the back end driver to a front end driver to which no such access is authorized.

Figure 6:
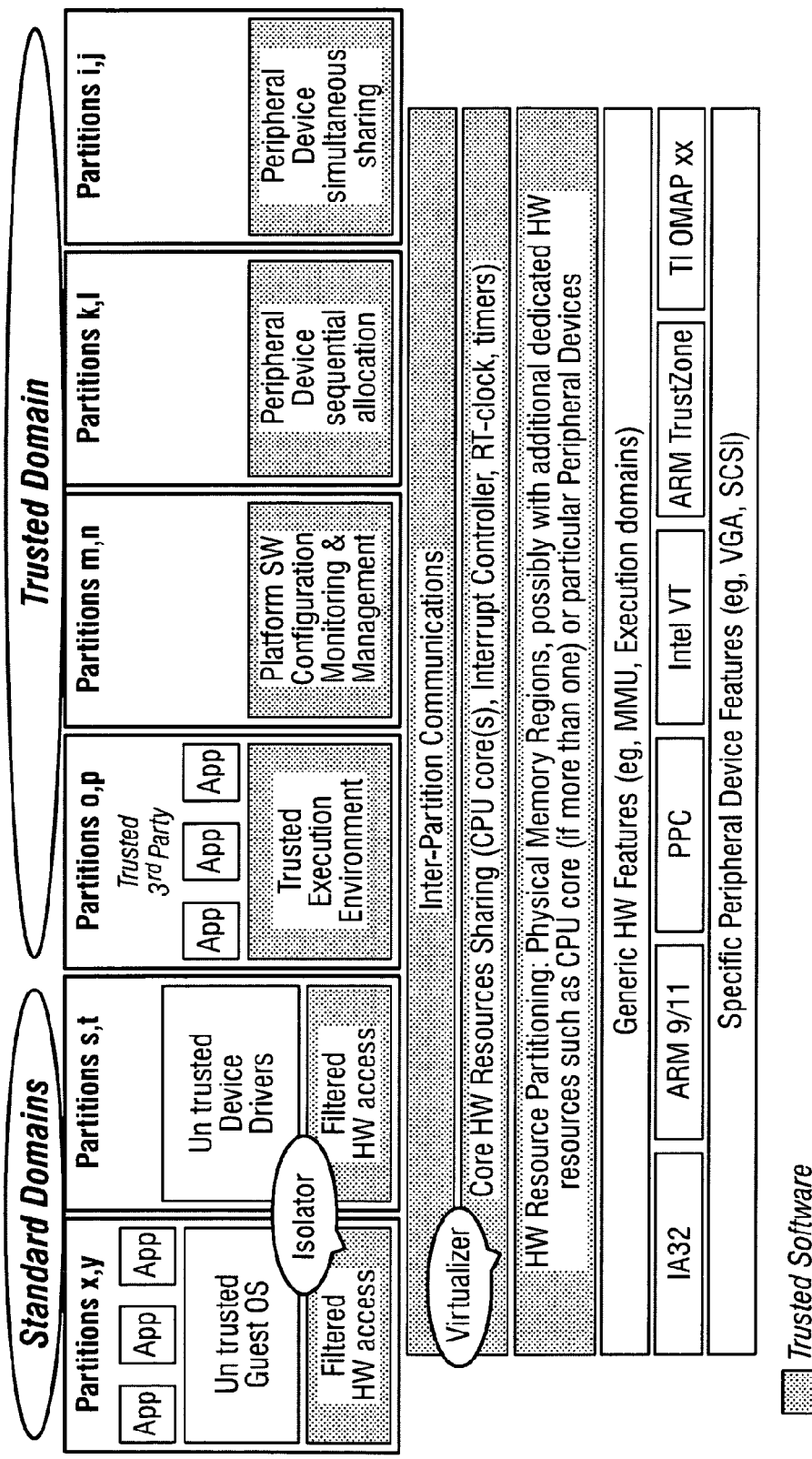
FIG. 6 is a schematic block diagram illustrating the functional trusted execution hardware in accordance with an embodiment of the invention.
Figure 7:
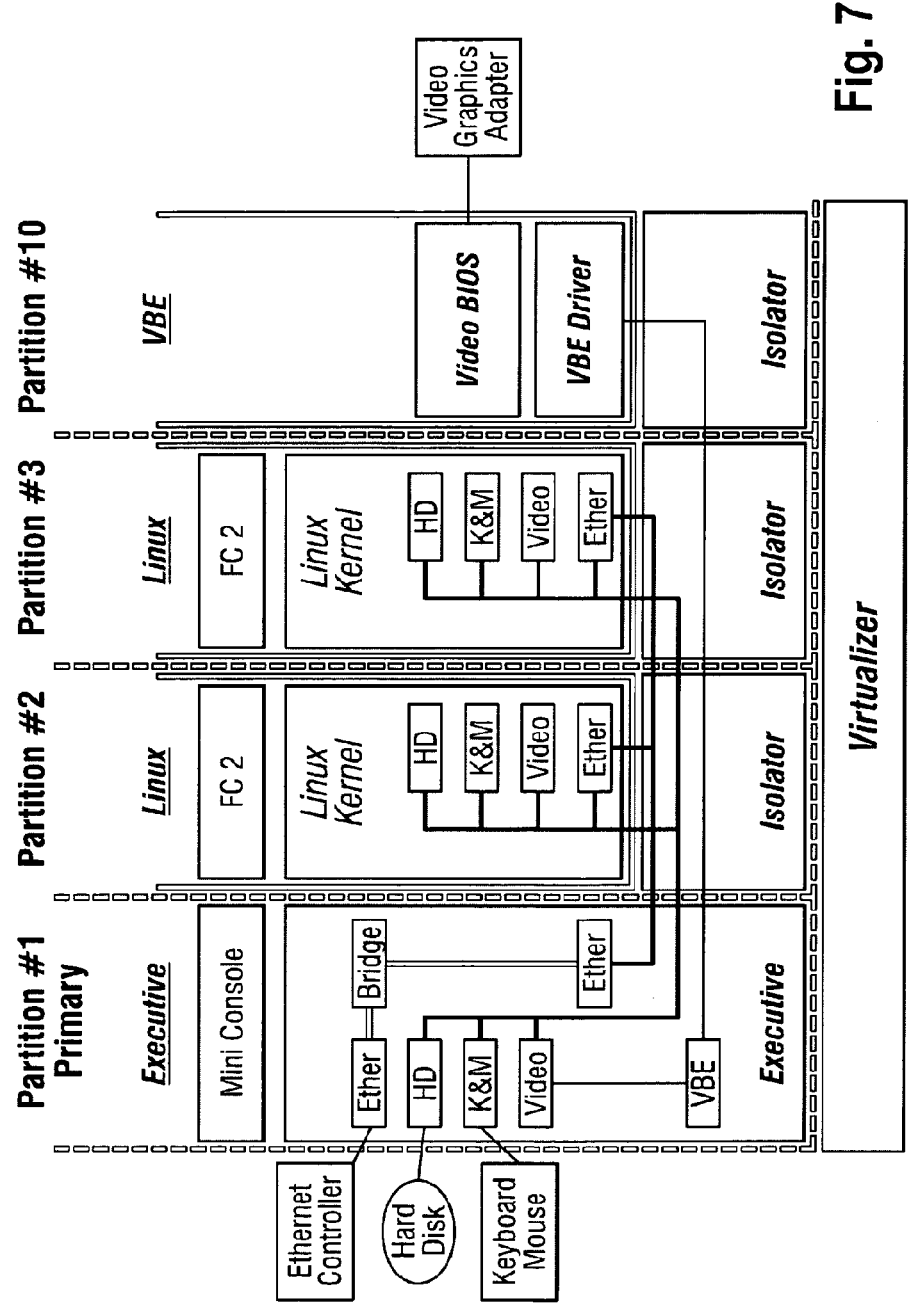
FIG. 7 is a schematic block diagram illustrating the control of access to I/O interfaces from the trusted domain in accordance with an embodiment of the invention.

FIGS. 6 and 7 illustrate general "trusted execution" architectures in accordance with embodiments of the invention.

The virtualizer is responsible to dispatch all hardware resources available on the platform across different partitions. In particular, the most important virtualizer role is to dispatch dynamic resources (e.g., CPU, FPU, MMU) between partitions providing an independent execution environment in each partition. The static resources distribution is mostly based on a cooperative approach where the virtualizer provides a global resource repository and a common framework to manage static resource allocations. Using such virtualizer services, static resources are cooperatively distributed by software miming in each domain.

The "Trusted Executive" provides a secure execution environment to run trusted agents. Note that "Trusted Executive" is there to support core security features (e.g., cryptography, measurements, attestation, authentication, trusted devices access) needed to run other trusted agents. The "Trusted Executive" provides basic kernel services such as multi-task scheduling, synchronization primitives, timers, memory management and so on.

The isolator is responsible to provide an execution environment within a standard domain that is safe to the secure domain and to the other standard domains. The main isolator role is to build a "brick wall" which protects hardware resources not owned by the domain from being accessed by a standard software running within the domain. In addition, the isolator provides virtual devices making possible for a secure communication link to be established between domains. In other words, the isolator provides secure doors in the brick wall which can be inter-connected over secure tunnels.

While the virtualizer and "Trusted Executive" components are unique on the platform, there are multiple isolator instances miming concurrently—one isolator instance per standard domain. Note that isolator instances running on the same platform do not necessarily provide a homogeneous execution environment. It is possible to run "Isolators" of different nature for different domains providing a heterogeneous execution environment. In particular, the architecture does not prevent to run different operating systems in different standard domains (Linux and Windows, for example).

Virtualizer

The virtualizer splits a single hardware in multiple partitions, i.e. one primary partition and (optionally) multiple secondary partitions. A single hardware platform is considered by the virtualizer as a set of hardware resources (e.g., CPU, MMU, RAM, I/O devices) and the main role of the virtualizer is to dispatch these resources among partitions.

Each partition is dedicated to run an Execution Environment managing resources assigned to the partition. Note that existing operating systems need to be ported on virtualizer to run within a partition as a guest OS. In other words, sources of an existing operating system kernel have to be modified in order to run within a partition created by the virtualizer. The virtualizer itself runs with the higher level of privilege. Depending on the hardware features available, operating system kernels could also run in privileged mode. In such case, there is no absolute protection between such partitions. The virtualizer architecture relies on a correct behavior and cooperation of the operating system kernels running in privilege mode within individual partitions.

In the trusted system, an un-trusted operating system kernel is completed with an isolator which is described in more detail below. In the trusted system, the operating system kernel is running on top of the isolator, in un-privileged execution mode which provides a safe execution environment to the other partitions. This means that a correct and co-operative behavior is no more required from an operating system kernel, running on top of isolator which assures that the system integrity, security and availability cannot be compromised by such an operating system.

According to an embodiment, there is a specific topological relationship between the trusted and standard software domains ("trusted system") and the primary and secondary execution partitions. The trusted virtualizer is associated with the trusted domain and provides multiple execution partitions, i.e. one primary and multiple secondary partitions. The primary partition runs exclusively software from the trusted domain. This is the "Trusted Executive" and trusted agents. A secondary partition can run additional trusted software or instances of an isolator supporting un-trusted execution environments. One standard domain is usually associated to one secondary partition consisting of one instance of an operating system kernel and multiple user processes running on top of the kernel.

All hardware resources available on a platform are split in two basic categories: static and dynamic.

Most hardware resources are static (e.g., RAM, I/O devices) and typically assigned to a given partition boot (or even at build) time and therefore their owner is never (or rarely) changed. Thus, the static resources distribution is quite straight forward and it is mostly based on a cooperative approach involving operating system kernels running in individual partitions. The virtualizer basically provides a global static resources repository and a common framework to manage resources allocation. Using virtualizer tools, static resources are cooperatively distributed by software running in each individual partition.

The main dynamic resource available on a hardware platform is the Central Processor Unit (CPU) together with optional CPU auxiliary devices like coprocessors (e.g., Floating Point Unit (FPU)) and/or a Memory Management Unit (MMU). The main role of the virtualizer is to dynamically share the CPU resource between partitions using a predefined scheduling policy. The virtualizer performs a switch from one partition to another providing a virtual CPU (as well as associated auxiliary devices: FPU and MMU) to each individual partition. At partition switch time, the virtualizer saves and restores state of the CPU, FPU and MMU devices making such a partition switch transparent for operating system kernels.

Virtualizer Scheduler

In an embodiment, the CPU resource dispatching is asymmetric with respect to the primary and secondary partition type. Basically, the primary partition is privileged in terms of CPU resource. By default, the virtualizer scheduler gives the CPU resource to the primary partition. The CPU resource becomes available for secondary partitions only when the primary operating system explicitly releases the CPU resource invoking the virtualizer. At this moment, the virtualizer scheduler chooses a ready to run secondary partition using a predefined scheduling policy and performs a partition switch activating such a secondary partition.

Once a hardware interrupt occurs while a secondary partition is active, the CPU resource is unconditionally given back to the primary partition. In other words, if a hardware interrupt occurs when a secondary partition owns the CPU, the virtualizer switches to the primary partition and invokes an Interrupt Service Routine (ISR) of the primary operating system kernel in order to handle the interrupt. Execution of the interrupted secondary partition can be continued only when the primary operating system finishes all interrupt related activities and invokes the virtualizer in order to release the CPU.

In other words, the virtualizer scheduler policy is used to schedule secondary partitions only. Thus, the virtualizer scheduler is a second level scheduler explicitly activated by the primary operating system.

A common practice is to release the CPU resource (and therefore to activate the virtualizer scheduler) in the idle loop of the primary kernel. This puts the secondary partitions activity to a kind of background level of the primary operating system scheduler. Note however that it is also possible to raise up priority of the secondary partitions activity by implementing such a CPU release in a dedicated thread running on an intermediate priority or, more generally, in a thread belonging to a given scheduling class. Analogous to the idle loop, such a special thread can invoke the virtualizer in order to release CPU and to activate the virtualizer scheduler. In this case, the primary operating system will be scheduled back again when either an interrupt occurs or all secondary partitions are idle. Such a technique allows to associate the virtualizer scheduler to a given scheduling class of the primary operating system and therefore to put it in a middle of the primary scheduling hierarchy.

In order to schedule secondary partitions, the virtualizer executive provides a classical priority based scheduler. In addition, the virtualizer executive supports a fair-share scheduling policy allowing assign a given CPU resource percentage to a given secondary partition. Note that when distributing the CPU resource in a fair-share fashion between secondary partitions, the virtualizer scheduler is able to either include or exclude the CPU resource consumed by the primary partition to/from the CPU budget. The fair-share scheduling policy is implemented on top of the priority based scheduler. It dynamically adjusts the secondary partition priority depending on consumed CPU resource.

I/O Devices

The virtualizer usually does not manage I/O devices except a serial line which is then dedicated to a console/debug link. This means that the virtualizer component does not contain any device drivers. A hardware device available on the platform is always managed by an appropriate operating system driver running in either the primary or the secondary partition. Any operating system running on top of the virtualizer is responsible to avoid launching drivers for devices which are not owned by the partition. This is to ensure that a given device is not concurrently serviced by multiple device drivers running in different partitions. An exclusive device access makes it possible to run native operating system drivers in any (primary as well as secondary) partition.

It is important to underline that when porting an operating system on top of virtualizer, it is usually not required to modify device drivers.

Virtual Devices

In contrast to the majority of I/O devices which are exclusively used by only one partition, there are also a small number of system devices which should be available in each partition in order to make an operating system functional. A typical list of such system devices is as follows:

Tick Timer (TICK)
Real Time Clock (RTC)
Programmable Interrupt Controller (PIC)

In an embodiment, the above system devices are attached to the primary partition and therefore they are managed by native back end drivers of the primary operating system.

In order to make system devices also available within any secondary partition, the virtualizer replaces the real system devices with virtual front end devices. The virtualizer does not implement itself such virtual devices; rather it specifies their interfaces and provides a framework helping to implement them. The primary operating system is in charge of providing back end drivers implementing virtual devices available for secondary partitions. Obviously, in the primary operating system, this requires some changes (or extensions) in existing native drivers servicing system devices being virtualized. In the secondary operating system, this also requires to replace the real system devices drivers with new virtual front end drivers managing virtual system devices.

Virtual Bus

The virtualizer provides a kind of virtual bus (VBUS) connecting all partitions and making it possible for inter-partition communication channels to be established between different operating systems. Analogous to virtual system devices, the virtualizer does not implement itself communications drivers; rather it specifies standard communication protocols and provides a framework to implement communication drivers in the primary and secondary operating systems.

In the trusted system, the following communication protocols are available:

Basic raw protocol (BUSRAW)
Ethernet protocol (BUSETH)
Serial line protocol (BUSTTY)
Block device protocol (BUSBLK)

Using the basic raw protocol (BUSRAW), operating systems running in different partitions are able to communicate over simplex (i.e., unidirectional) communication pipes. Such a VBUS pipe provides a reliable connection accepting frames of variable sizes. The frame maximum size accepted by a given pipe is specified at pipe creation time.

On top of the BUSRAW protocol, the virtualizer specifies a virtual Ethernet (BUSETH), a virtual serial line (BUSTTY) and a virtual block device (BUSBLK) protocols.

The BUSETH protocol provides a virtual local Ethernet link connecting certain partitions.

The BUSTTY protocol provides a virtual serial line between two given partitions.

The BUSBLK protocol connects back end and front end block device drivers running in two different partitions.

Isolator

Isolator for IA-32

The isolator is running in the trusted domain at privileged CPU level (i.e., in the protection ring 0). In order to provide a safe execution environment, the isolator runs a guest OS kernel at non privileged CPU protection level in the ring 1. This execution level is still considered as supervisor from the MMU point of view, although privileged instructions (e.g., CLI, STI, MOVE to/from a control register) are no more available in ring 1. An attempt to execute such a privileged instruction causes a general protection fault exception to be delivered to the isolator.

The isolator replaces unavailable privileged CPU instructions with equivalent macroscopic services. The guest OS kernel running on top of isolator is modified in order to avoid usage of privileged instructions. Instead, the kernel explicitly invokes isolator services in order to perform privileged operations. All these operations are entirely controlled by the isolator avoiding unauthorized/incorrect accesses to the CPU resources.

The isolator does not allow the guest OS kernel to modify directly the MMU translation tree. All physical pages used in the MMU translation tree (i.e., page tables and page directories) are always mapped read only preventing the kernel from an unauthorized modification of a page table/directory entry (PTE). The only way for the kernel to modify a virtual to physical translation (i.e., a PTE) is to invoke an appropriate isolator service. When a new translation (from virtual address space to physical address space) is established, the isolator checks physical address avoiding unauthorized access to RAM and I/O resources. Changing protection attributes, the isolator also checks that the write protection of page tables/directories is not compromised by the kernel.

Instead of hardware interrupts masking mechanism based on the interrupt enable flag (IF), the isolator implements software interrupts masking based on global data shared between the kernel and isolator.

The isolator also provides the kernel with a virtualized contiguous physical address space which is mapped to the machine (real) addresses. Such an intermediate mapping between machine and physical addresses makes it possible to transparently substitute on the fly machine pages owned by the kernel.

The isolator restricts kernel accesses to ISA I/O ports using an I/O bitmap string of the Task State Segment (TSS). By default, all ISA I/O ports are inaccessible for the kernel. On the other hand, it is possible to arbitrary enable accesses to a given I/O port from the ring 1. Accesses of the kernel to memory mapped I/O registers (on PCI bus, for example) are controlled through the MMU mappings as described above. By default, all such accesses are disabled but the isolator can allow the kernel to map certain I/O ranges to its virtual space. This makes it possible to run native device drivers on top of the isolator. However, some requirements on device should be met in order to do not compromise the system integrity and security. In addition, the isolator provides some virtual devices to the kernel. Such virtual devices typically replace mandatory system devices like tick timer.

Secured Virtual Devices

A back end virtual device driver running in the isolator provides the virtual device interface to the underlying guest OS kernel running outside of the trusted domain. This virtual device is managed by a guest OS front end driver specifically developed for this virtual device interface. In order to provide a safe execution environment, the isolator back end driver checks all requests coming from the guest OS front end driver in order to prohibit accesses to physical memory not owned by the Linux kernel. The isolator back end driver implementation is based on the isolator front end driver which is connected to the "Trusted Executive" back end driver running in the primary partition. The "Trusted Executive" back end driver uses a real device driver in order to access the underlying hardware.

A tandem of the "Trusted Executive" back end and isolator front end drivers typically uses a shared device descriptor to keep the current device state while inter partition interrupts are normally used to signal device state changes. A device specific protocol over the virtual bus may also be used in order to transfer pay load data across partitions.

Access rights to a given physical device from a given back end driver are controlled by "Trusted Executive" security agents.

Real Devices

Guest OS access to a real I/O device residing on either ISA or PCI bus can be enabled by the isolator. In addition, virtualized hardware interrupts can be delivered to the guest OS kernel over a dedicated event channel. Thus, in theory, it is possible to run a native driver for a real I/O device on top of isolator. In practice, however, most of such drivers would compromise both trusted system integrity and security. There are two potential problems related to such a driver.

First, the device can be programmed in such a way that it will disturb a normal system behavior by consuming too much hardware resources. In general, there are two kinds of hardware resources used by a device: processor interrupts and bus transactions. A wrongly programmed device can generate high frequency (or stuck) interrupts and this can disturb other devices sharing the same interrupt line. In addition, a pending interrupt can be not acknowledged (and therefore not re-enabled) by the driver and this will prevent any future interrupts on this line to be delivered to the processor. If device has a master capability on the bus, it can be wrongly programmed in order to generate too many transactions on the underlying bus disturbing other peer devices. The latter case can be prevented on some buses which allow to control the bus arbiter policy.

Second, if the device is Direct Memory Access (DMA) capable, the device can be programmed to perform an I/O transfer to/from any physical memory accessible from the bus. Usually, all physical memory is accessible from an I/O bus for a DMA transfer. Thus, such a feature compromises not only the system integrity (physical memory belonging to the trusted domain can be corrupted by the driver using DMA) but also the system security (physical memory belonging to the trusted domain can be read by the driver using DMA).

Accordingly, in order to do not compromise the trusted system integrity and security, the isolator can allow access to a real I/O device outside of the trusted domain only if the device nature meets the following requirements:

The device either does not use interrupts at all or interrupts used by the device are all exclusive The device cannot act as master on the bus The last requirement automatically excludes all DMA capable devices.

Secured Shared Device Drivers

Security critical devices are managed using trusted device drivers. In a workstation environment, trusted devices can basically be split in four groups:

Human interface devices

Network devices

Storage devices

Secured Human Interface Devices

The following input human devices are supported by an embodiment of the present invention:

Keyboard (PS/2 and USB)

Pointer (PS/2 and USB)

As a human output device, the "Trusted Executive" supports a graphics adapter in VGA and VESA modes.

The trusted system allows a user to dynamically switch human interface devices between partitions without compromising the system security and integrity. Usually, the switch command comes from the keyboard as a predefined sequence of scan codes and all human interface devices are normally switched all together. In the trusted system the human interface devices are security critical and therefore they are managed in the trusted domain by drivers. In order to make these devices accessible from guest OS, the trusted architecture virtualizes them providing a pair of front end and back end drivers running in the primary partition and guest OS (secondary partition), respectively. These drivers follow the secured virtualization schema described above. In particular, the virtualized input data path goes through the "Trusted Executive" intermediate front end and back end drivers which provide such a virtualized device to guest OS in a secure manner.

The keyboard and mouse are primarily managed by the back end driver of the primary partition and the input is routed either to a primary partition application or a virtual front end driver running in the partition currently owning the human interface devices.

From the guest OS point of view, all human interface devices are always present and operational even when they are not owned by the partition at current time. Obviously, input devices do not provide any input in a disconnected state. On the other hand, because it is not possible to prevent output on the display, the frame buffer memory should always be available for the video driver even in the disconnected state.

Secure Device Sharing Examples

Figure 10:
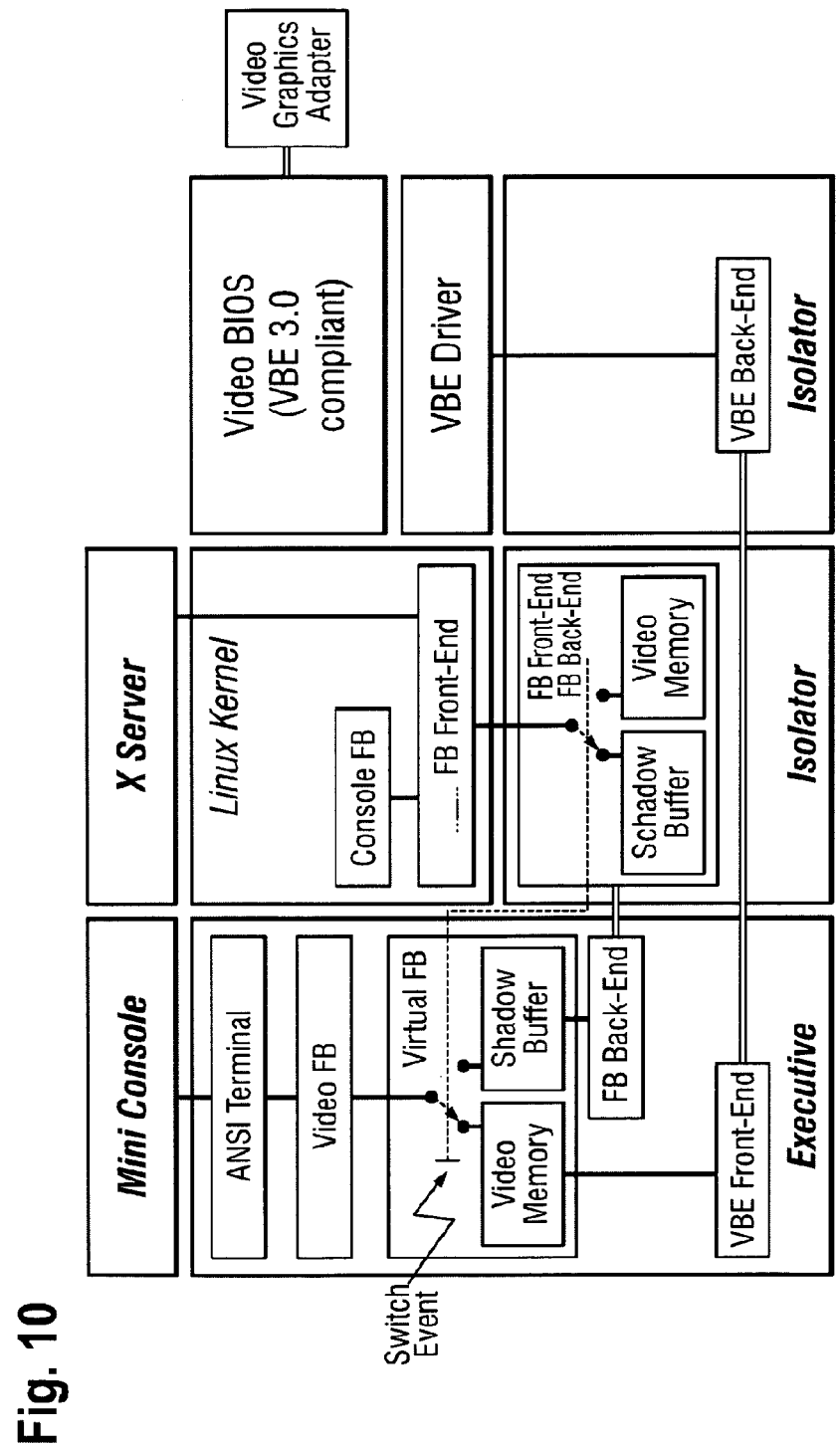
FIG. 10 is a schematic block diagram illustrating the control of access to a shared user output device from the trusted domain in accordance with another embodiment of the invention.
Figure 11:
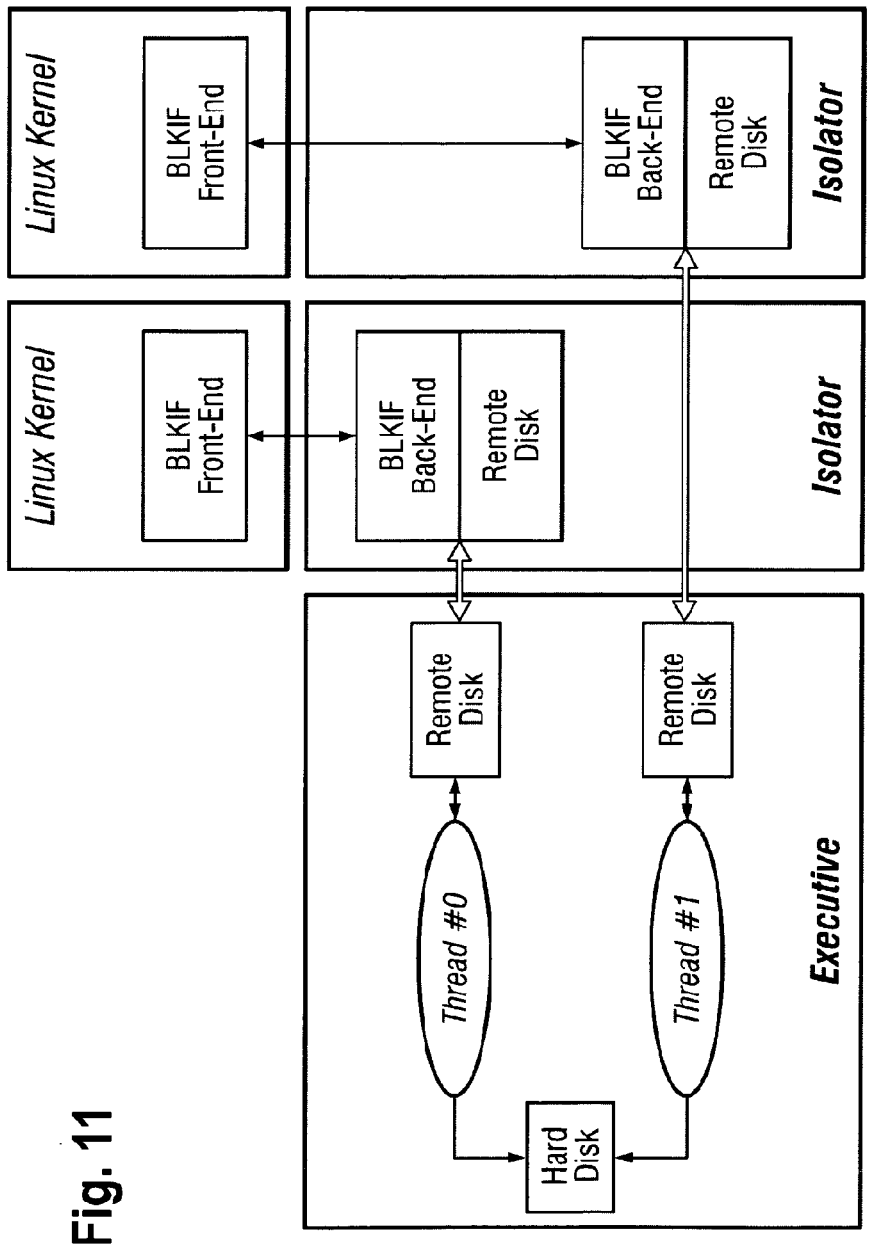
FIG. 11 is a schematic block diagram illustrating the control of access to a shared storage from the trusted domain in accordance with an embodiment of the invention.
Figure 12:
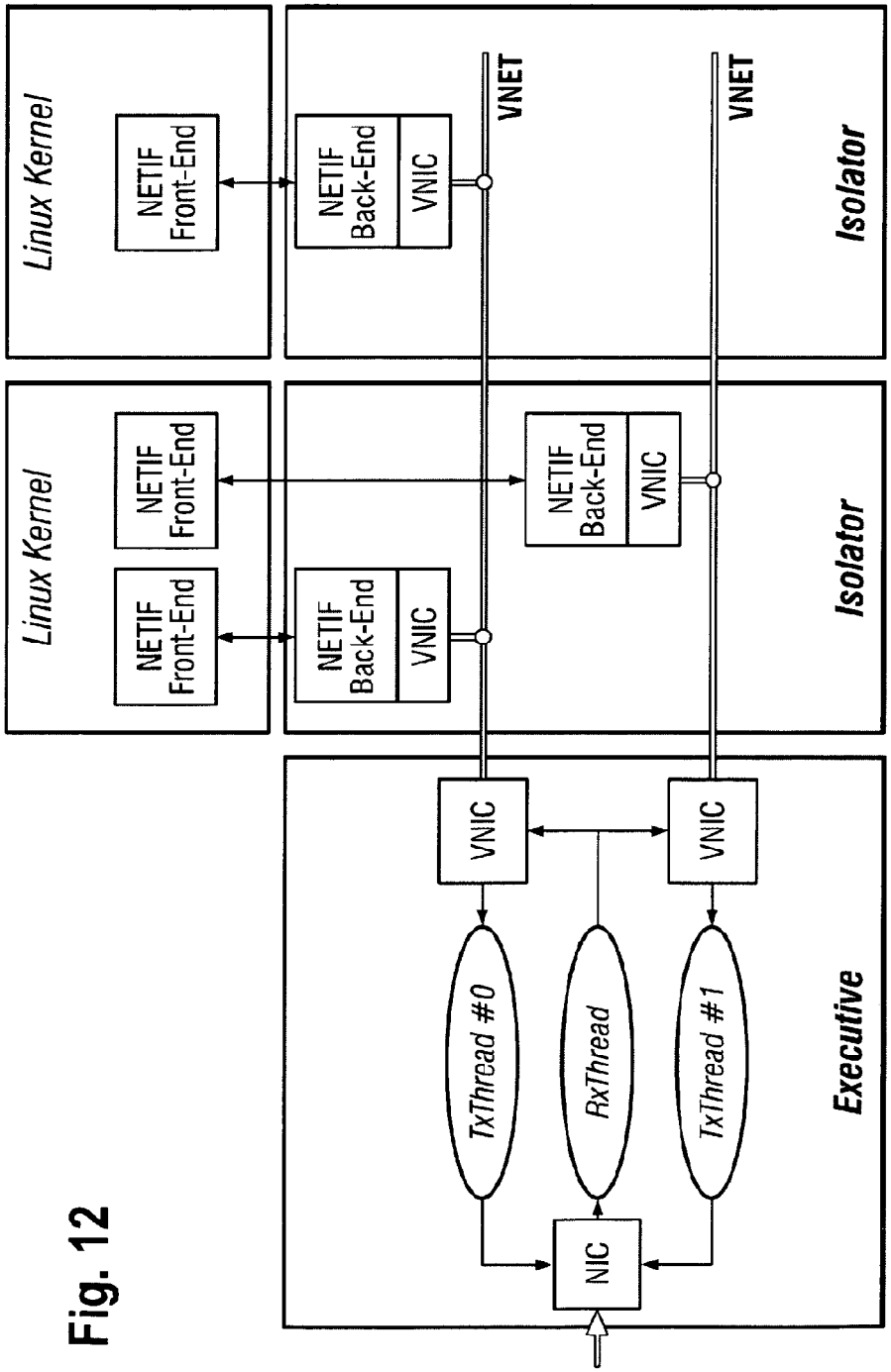
FIG. 12 is a schematic block diagram illustrating the control of access to a shared network interface from the trusted domain in accordance with an embodiment of the invention.

FIGS. 10 to 12 illustrate secure device sharing examples in accordance with embodiments of the invention. In particular, FIG. 10 illustrates a secure video sharing example. FIG. 11 illustrates a secure disk sharing example. FIG. 12 illustrates a secure network sharing example.

Secured Virtual Keyboard and Mouse

Figure 8:
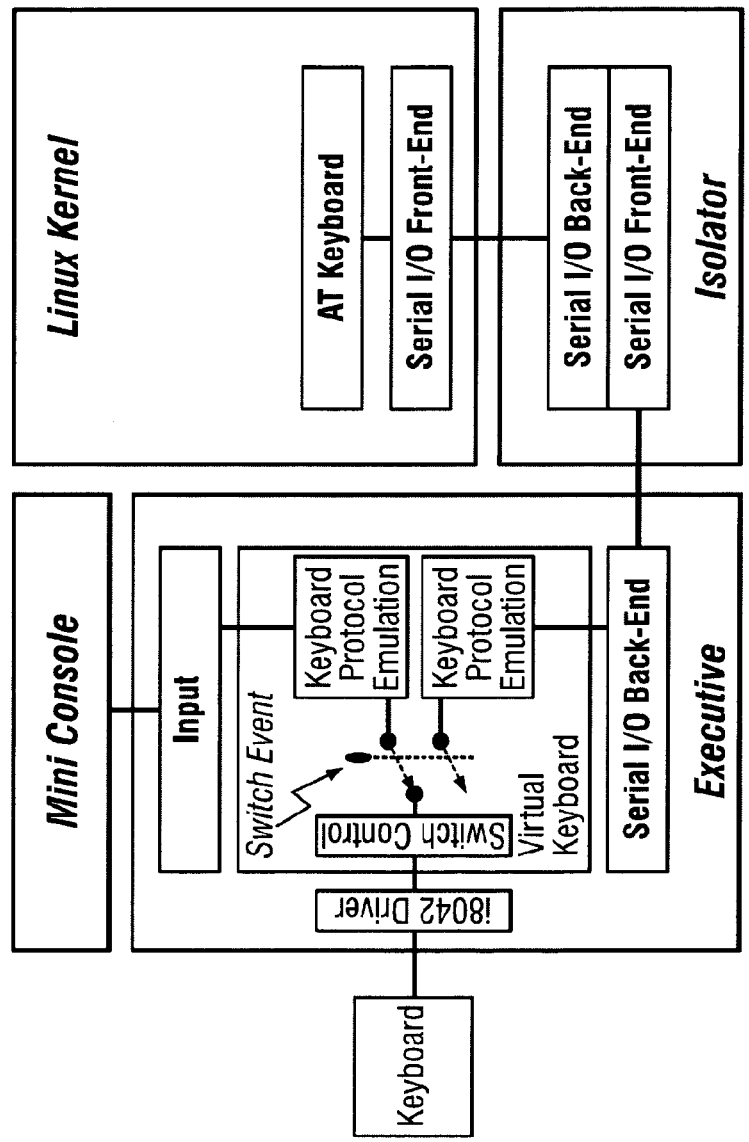
FIG. 8 is a schematic block diagram illustrating the control of access to a shared user input device from the trusted domain in accordance with an embodiment of the invention.

FIG. 8 illustrates how a secured virtual keyboard is provided to each guest OS running in its respective partition.

The virtual keyboard module (VKBD) is running on top of the low level driver managing the physical keyboard interface. This low level driver allows the VKBD to send/receive scan codes to/from the keyboard interface. For each partition (including the primary partition), the VKBD provides a keyboard protocol emulation engine. Such an engine emulates PS/2 keyboard responses on configuration commands issued by guest OSs.

In addition, the emulation engine memorizes all received configuration commands to store a virtual keyboard state. When the keyboard is switched from one partition to another the emulation engine sets up the keyboard physical state according to the virtual one. In order to perform such synchronization, the engine resets the physical keyboard and then resends to the keyboard the configuration commands which were previously memorized.

Only one emulation engine at time is connected to the physical keyboard. Such an active engine not only memorizes configuration commands received from the operating system but also forwards some of them to the physical keyboard. Some configuration commands which can compromise the keyboard availability (e.g. the keyboard disable command) are filtered out and never forwarded to the physical keyboard. Instead, such commands are executed virtually (i.e., emulated) in order to reply to the guest OS appropriate acknowledgment codes and to change the virtual keyboard state accordingly.

On input, any scan codes received from the physical keyboard by the active engine are normally forwarded back to the guest OS. Obviously, an inactive engine never reports any input scan codes to its associated guest OS. In other words, virtual keyboard keys are never hit in inactive state.

Special serial I/O front-end driver is provided in order to connect a virtual keyboard to each guest OS kernel. Each driver provides a standard serial I/O interface to upper layers of guest OS kernel (e.g., AT keyboard module) making the keyboard virtualization mechanisms transparent.

The serial I/O front-end driver communicates to an isolator back-end driver which, in turn, communicates with the VKBD over a channel established by serial I/O back-end/front-end peer drivers. In other words, the isolator provides a secure serial I/O interface to the guest OS kernel on top of the trusted, virtualizer based, serial I/O communication channel.

In order to switch Human Interface Devices (HID) from one partition to another, the VKBD compares input scan codes with a predefined code sequence. Once a match is detected, the physical keyboard is switched by deactivating the current emulation engine and by activating the emulation engine which corresponds to the partition owning the keyboard. In addition, a system wide HID SWITCH event is broadcast. This event is received by other HID virtualization drivers (mouse and video) in order to follow the keyboard by switching to the same partition. In such a way, all HIDs are switched together and the switch is driven by the VKBD.

The mouse device virtualization architecture is quite similar to that of the keyboard. The main difference is that the virtual mouse module (VMOUSE) supports multiple extensions of the basic PS/2 mouse protocols. At initialization time, VMOUSE probes the physical mouse device in order to detect available mouse extensions. Depending on probing results, the mouse protocol emulation engine is then tuned to emulate extensions available on the physical mouse device.

Secured Virtual VGA

Figure 9:
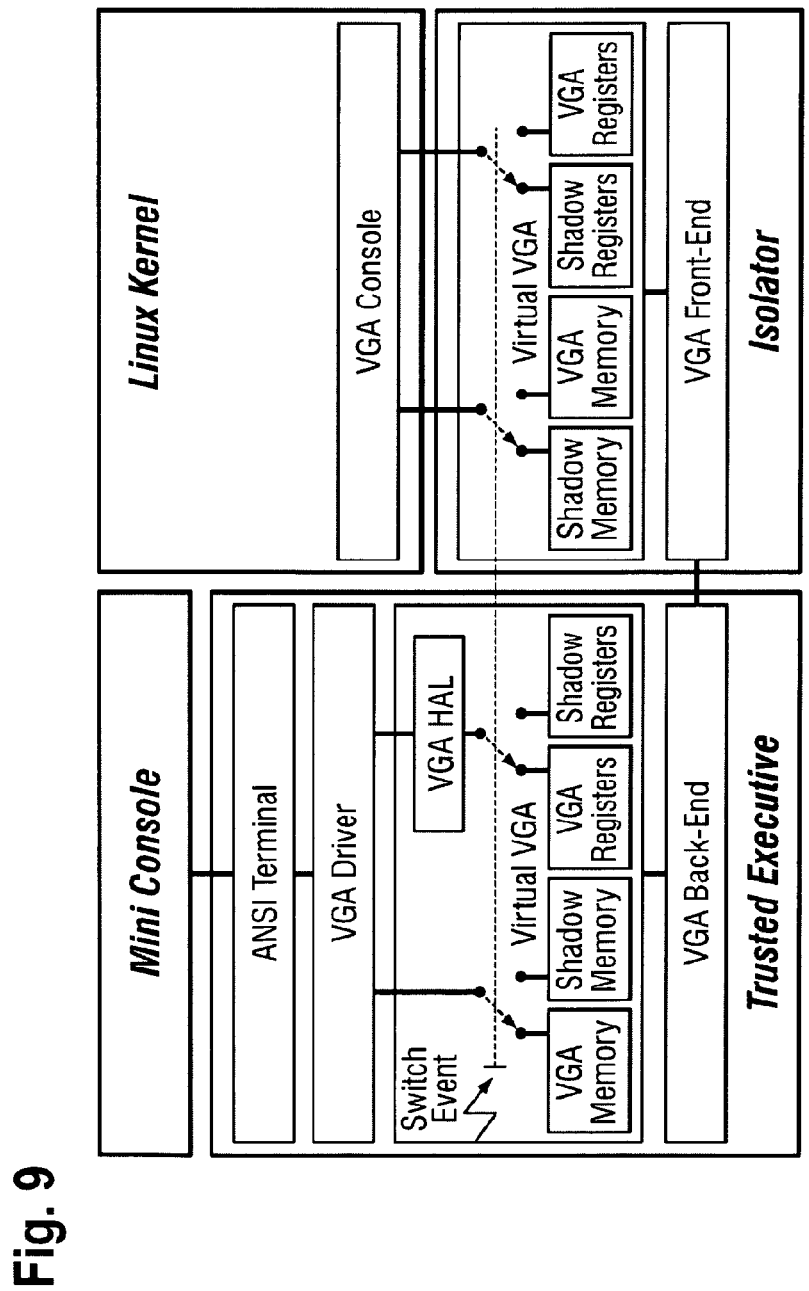
FIG. 9 is a schematic block diagram illustrating the control of access to a shared user output device from the trusted domain in accordance with an embodiment of the invention.

FIG. 9 illustrates how a virtual VGA is provided to each guest OS running in its own partition.

A virtual VGA module (VVGA) is running in the primary partition and each isolator instance. The main task of the VVGA is to route guest OS accesses to either the physical VGA hardware (registers and memory) or its shadow images. When a VVGA instance is active (i.e., it is connected to the physical VGA hardware), the corresponding guest OS directly accesses the VGA memory and registers. Otherwise, when a VGA instance is inactive, guest OS accesses are redirected toward a shadow memory image.

In other words, the VVGA manages a virtual VGA controller which is used when the physical VGA is disconnected from the corresponding guest OS.

When the physical VGA is acquired by a guest OS, the VVGA synchronizes the physical VGA controller with the virtual one and enables direct accesses to the VGA hardware. When the physical VGA is released by a guest OS, VVGA synchronizes the virtual VGA controller with the physical one and redirects any further accesses to the shadow VGA registers and memory preventing direct accesses being made from the corresponding guest OS to the VGA hardware.

The VVGA module provides a VGA Hardware Abstraction Layer interface (HAL) to the upper layer software, in particular, to the VGA driver. All accesses to the VGA registers are performed through the VGA HAL interface of the VVGA which routes these accesses to either physical VGA registers or shadow registers.

The VGA memory also takes a part in the VGA HAL Interface which exports its virtual base address. Keeping the same virtual addresses, the VVGA remaps to these virtual addresses either the physical VGA or shadow memory depending on the VGA hardware owner. On the guest OS side, a VVGA driver is provided by the isolator. A native (unmodified) VGA console driver is miming in the guest OS kernel. The guest OS VGA console driver issues in/out instructions in order to access VGA registers and maps the VGA physical memory to the kernel virtual space in order to access VGA planes. The isolator disables accesses to the VGA ports from ring 1 where the guest OS kernel is running. Thus, an in/out instruction issued by the guest OS VGA console results in a general protection fault being determined by the isolator. Inside the general protection fault handler, VVGA driver emulates such a faulted instruction using either the physical VGA registers or their shadow images depending on the VGA hardware owner. Once the instruction is emulated, the guest OS code execution is continued.

The VVGA keeps a shadow video memory buffer in the normal RAM. The VGA video memory is substituted by the shadow register when the VGA hardware is not owned by the partition. Such a substitution is transparent to the guest OS VGA console driver.

When disconnecting the VGA hardware from the partition, the isolator modifies the MMU translation tree in order to map the shadow memory buffer in place of the VGA video memory and the video memory is copied to the shadow buffer. When connecting back, the isolator restores the MMU translations to the VGA video memory and copies the shadow buffer to the video memory. This requires to track in the isolator all MMU translations established by the guest OS to the VGA video memory.

In general, a single operation on the VGA controller requires multiple accesses being made to different VGA registers. An example is a VGA DAC color palette update which requires one write access being done to the palette index register which must be followed by three subsequent write accesses to the palette data register (for the read, green and blue color values respectively). It should be understood that the VGA hardware cannot be switched in the middle of such an update because the VGA switch saves/restores the color palette and therefore resets the VGA DAC state machine.

More generally, the VGA controller is a finite state machine and the VGA hardware cannot be correctly switched in certain states. Such VGA machine states—transition states and all other states—may be considered "final states". Accordingly, the VGA controller can only be switched from one partition to another in a final state. Only a final state of the VGA machine allows the VGA controller to be correctly saved and restored.

Therefore, the VVGA performs transactional updates of VGA registers. Such a technique consists in deferring accesses to VGA registers until a final state is reached. Once the VGA machine is in a final state, the VVGA issues all deferred accesses to the VGA controller automatically, i.e., within a critical section of code where the VGA switch is disabled.

In the color palette example given above, the final state of the VGA machine is reached when the last blue color is written to the palette data register. Three precedent write accesses (palette index, red and green colors) are transitional states of the VGA machine. Following the transitional technique described above, once a blue color write is intercepted, VVGA updates an appropriate VGA DAC palette color register in one atomic shot issuing four subsequent write accesses to VGA registers within a critical section of code.

The VGA hardware switch from one partition to another is orchestrated by the VVGA module using VGA back-end/front-end peer drivers miming on top of the isolator. Once a KBD SWITCH event is received by the VVGA module, the virtual VGA switch process goes through the following steps:
- The VGA controller state (memory planes and registers) is saved to the shadow data structures of the current VGA owner.
- A VGA_RELEASE event is sent to the current VGA owner. Upon receipt of such an event, the current VGA owner switches to the shadow VGA, as described above.
- The VGA controller state (memory planes and registers) is restored from the shadow data structures of the new VGA owner.
- A VGA_ACQUIRE event is sent to the new VGA owner. Upon receipt of such an event, the new VGA owner switches to the physical VGA, as described above.

Secured Virtual VESA

Referring to FIG. 10, a virtual VESA is provided to each guest OS running in its own partition.

A virtual VESA module (VVESA) is running in the primary partition and each isolator instance. The main task of the VVESA is to route guest OS accesses to either the physical video memory or its shadow image. When a VVESA Instance is active (i.e., it is connected to the graphics adapter), the corresponding guest OS directly accesses the video memory. Otherwise, when a VVESA instance is inactive, guest OS accesses are redirected toward a shadow RAM image of the video memory.

In other words, the VVESA manages a shadow video memory which is used when the graphics adapter is disconnected from the corresponding instance.

When the graphics adapter is acquired by an instance, the VVESA synchronizes the physical video memory with the shadow one and enables direct accesses to the video memory of the graphics adapter. When the graphics adapter is released by an instance, the VVESA synchronizes the shadow video memory with the physical one and redirects any further accesses to the shadow video memory, preventing direct accesses being made from the corresponding instance to the video memory of the graphics adapter.

A VVESA driver is provided to each guest OS by the isolator. The VVESA manages a shadow video memory buffer in the normal RAM. The physical video memory is substituted by the shadow memory when the graphics adapter is not owned by the partition. Such a substitution is transparent to guest OS video drivers.

When disconnecting the graphics adapter from the partition, the isolator modifies the MMU translation tree in order to map the shadow video memory in place of the physical video memory and the video memory is copied to the shadow buffer. When connecting back, the isolator restores the MMU translations to the physical video memory and copies the shadow buffer to the video memory. This requires to track in the isolator all MMU translations established by the guest OS video drivers to the graphics adapter video memory.

A special frame buffer front-end driver is provided to each guest OS in order to connect a virtual VESA to the guest OS kernel. The driver provides a standard frame buffer device driver interface to guest OS kernel modules (e.g., frame buffer console) and user space applications (e.g., X1 1 fbdev driver) making the video virtualization mechanisms transparent.

The guest OS frame buffer front-end driver communicates to VVESA over a isolator back-end driver which, in turn, communicates with the VVESA over a channel established by VESA back-end/front-end peer drivers running on top of the virtualizer.

There is a special partition, a so-called VESA BIOS Extension (VBE) partition, dedicated to run a VBE driver. Such a VBE driver is running on top of the isolator and its primary role is to create an execution environment necessary to invoke a video BIOS code located in a PROM residing on the graphics adapter.

A generic VBE interface allows the graphics adapter to be configured in various VESA modes which differ in screen resolution and color depth. A VBE 3.0 interface enables the video BIOS code execution in the Intel IA-32 protected mode which is directly supported by the isolator. Thus, the video BIOS code can directly be executed by CPU outside of the trusted domain without compromising the trusted system security and integrity. In fact, the video BIOS code is executing under same conditions as the guest OS kernel code. In particular, the video BIOS code is running in the (protected) processor ring 1.

VBE front-end/back-end peer drivers provide a remote interface to the VBE driver from the primary partition. This interface is exclusively used by the VVESA driver in order to configure the graphics adapter in a video mode requested by the virtual VESA instance owning the graphics adapter.

The graphics adapter switch is orchestrated by the VVESA module using the VESA and VBE back-end/front-end peer drivers running on top of the virtualizer. Once a KBD SWITCH event is received by the VVESA module, the virtual VESA switch process goes through the following steps:
- The video memory is saved to the shadow buffer of the current graphics adapter owner.
- A VVESA_RELEASE event is sent to the current graphics adapter owner. Upon receipt of such an event, the current graphics adapter owner switches to the shadow video memory, as described above.

The video mode of the graphics adapter is changed if necessary:

The video memory is cleared.

The partition running the VBE back-end driver is resumed.

Once the video mode is changed, the VBE partition is suspended.

The video memory is restored from the shadow buffer of the new graphics adapter owner.

A VVESA ACQUIRE event is sent to the new graphics adapter owner. Upon receipt of such an event, the new graphics adapter owner switches to the graphics adapter video memory, as described above.

Secured Virtual Network

Figure 13:
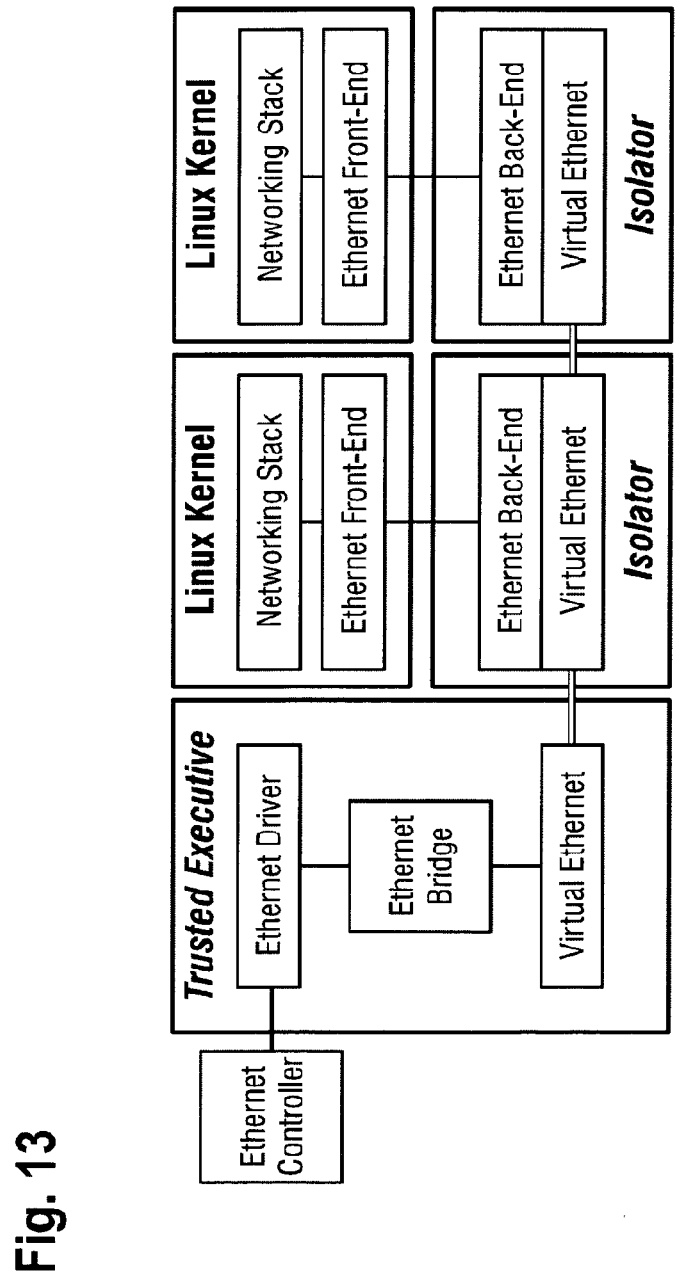
FIG. 13 is a schematic block diagram illustrating the control of access to a shared network interface from the trusted domain in accordance with another embodiment of the invention.

FIG. 13 illustrates how a virtual Ethernet link is provided to each individual guestOS running in its own partition.

Using a virtual Ethernet driver running in the "Trusted Executive" and in each guest OS, a virtual Ethernet link can be provided to each individual guest OS. The virtual Ethernet link is connected to the Linux kernel through a virtual network interface. The virtualizer provides a glue layer which translates the virtual Ethernet link interface to a secure virtual network interface.

Many independent Ethernet links can be created connecting a predefined set of guest OSs (i.e., Linux instances). In a typical trusted configuration, Ethernet links are used to provide peer-to-peer connections between the "Trusted Executive" and each Linux instance. Then, virtual Ethernet interfaces are bridged to a physical Ethernet controller in the "Trusted Executive".

Such an Ethernet bridge is a multi-threaded server where one thread is created per bridged virtual Ethernet interface (i.e., per guest OS in a typical trusted configuration). The Ethernet bridge allows a system administrator to configure the priority of such server threads in order to reflect the priority of secondary partitions associated to them.

Secured Virtual Block Device

Figure 14:
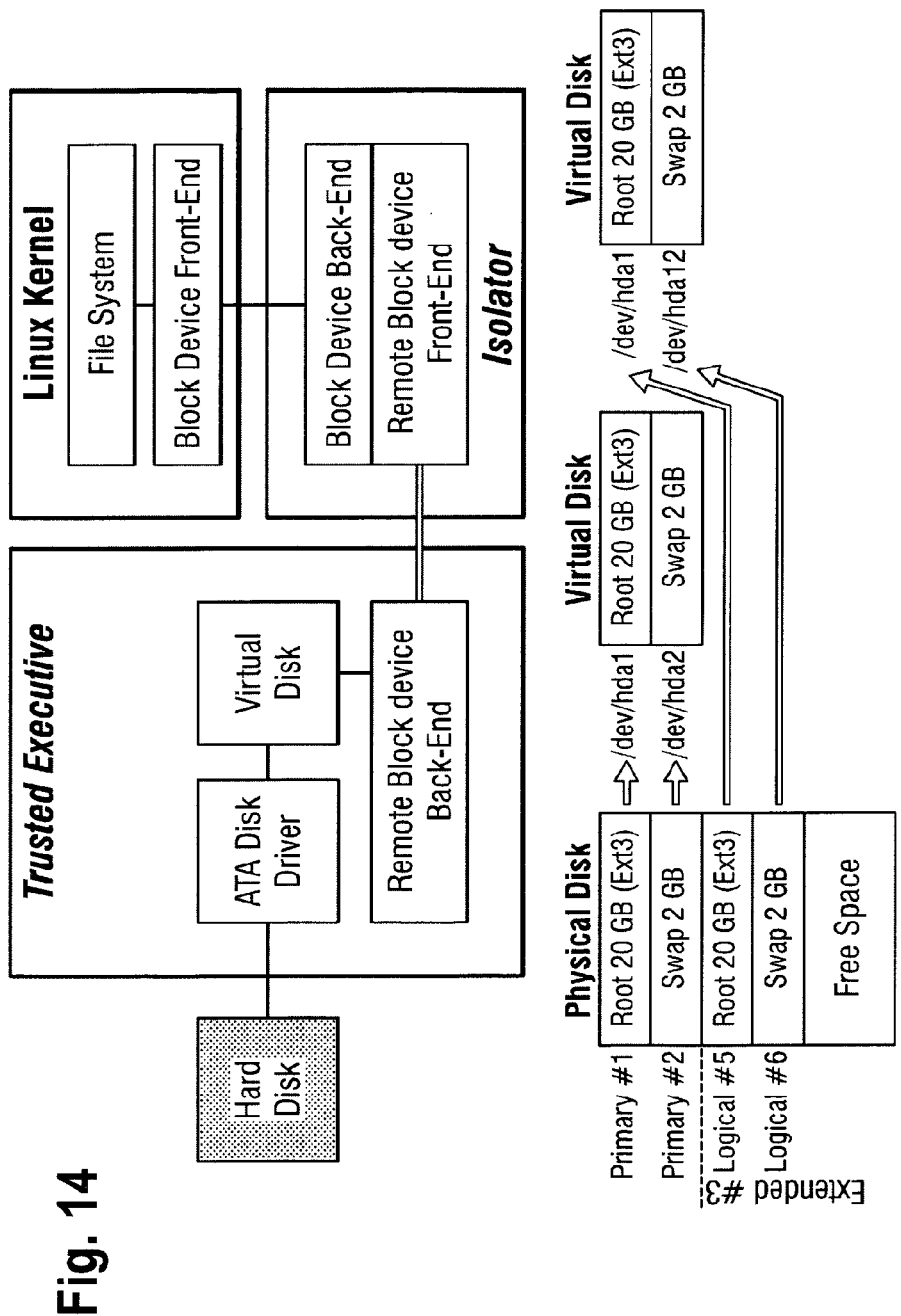
FIG. 14 is a schematic block diagram illustrating a virtual block device architecture according to an embodiment of the invention.

FIG. 14 illustrates how a virtual block device is provided to each guest OS running in its own partition.

A virtual disk module (VDISK) is running on top of a low level ATA disk driver. Using remote block device back-end/front-end peer drivers, a virtual block device can be provided to each individual guestOS running in its own partition. A remote block device is connected to the Linux kernel through a virtual block device interface. The virtualizer provides a glue layer which translates a remote block device interface (running directly on top of the "Trusted Executive" in the trusted domain) to a secure virtual block device interface.

The VDISK is configured in order to provide a virtual view to physical disk partitions. Basically, each physical disk partition can be either hidden from a given operating system or accessible in read/write or read-only mode. In addition, multiple disk partitions (potentially on different disks) can be combined in order to provide a single virtual block device.

FIG. 14 illustrates an example where four physical disk partitions are exported to two guest OSs. The first guestOS can access only two primary disk partitions which are mapped one-to-one to the /dev/hda1 and /dev/hda2 Linux devices. All other physical disk partitions are hidden from the first operating system. The second operating system can access only two logical (extended) disk partitions which are mapped to the /dev/hda1 and /dev/hda2 Linux devices. All other physical disk partitions are hidden from the second operating system. In this example, both guest OSs have an identical virtual view on physically distinct disk partitions.

The VDISK is a multi-threaded server where one thread per guest OS is created. The VDISK allows a system administrator to configure the priority of such server threads in order to reflect the priority of secondary partitions associated to them.

Virtualisation use Cases

Figure 15:
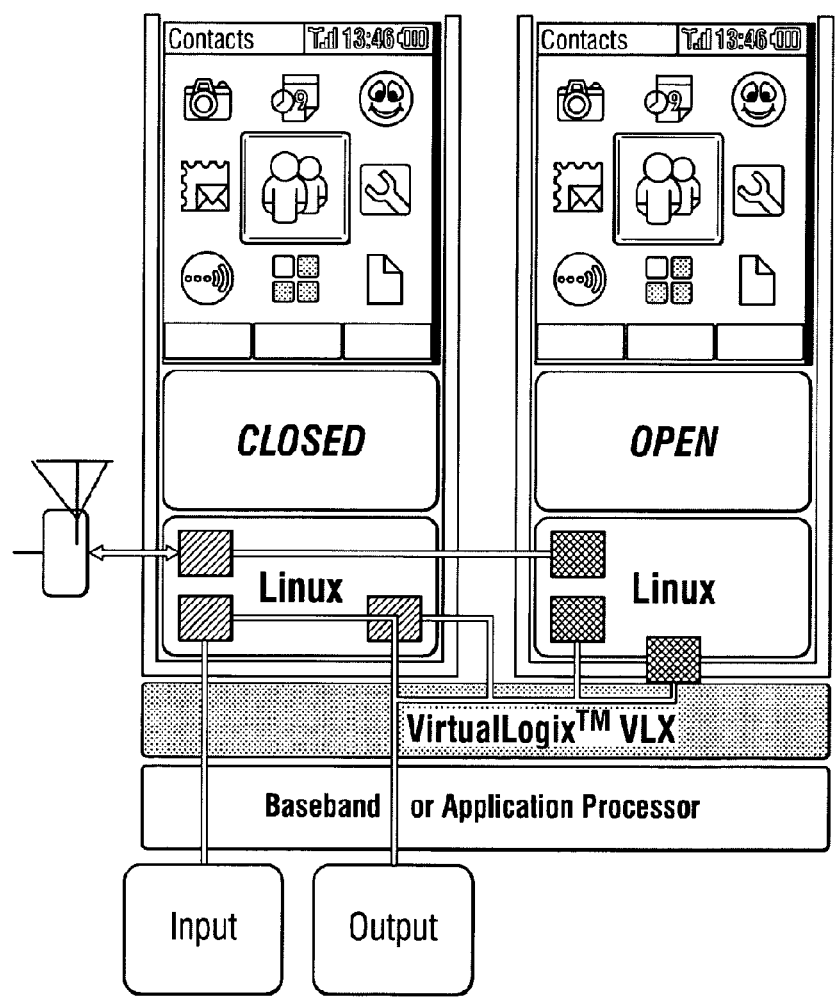
FIGS. 15 to 25 illustrate virtualisation use cases in accordance with embodiments of the invention.

FIGS. 15 to 25 illustrate virtualisation use cases in accordance with embodiments of the invention. FIG. 15 illustrates generally the co-existence of open and closed execution environments on the same hardware platform in accordance with an embodiment of the invention.

Figure 16:
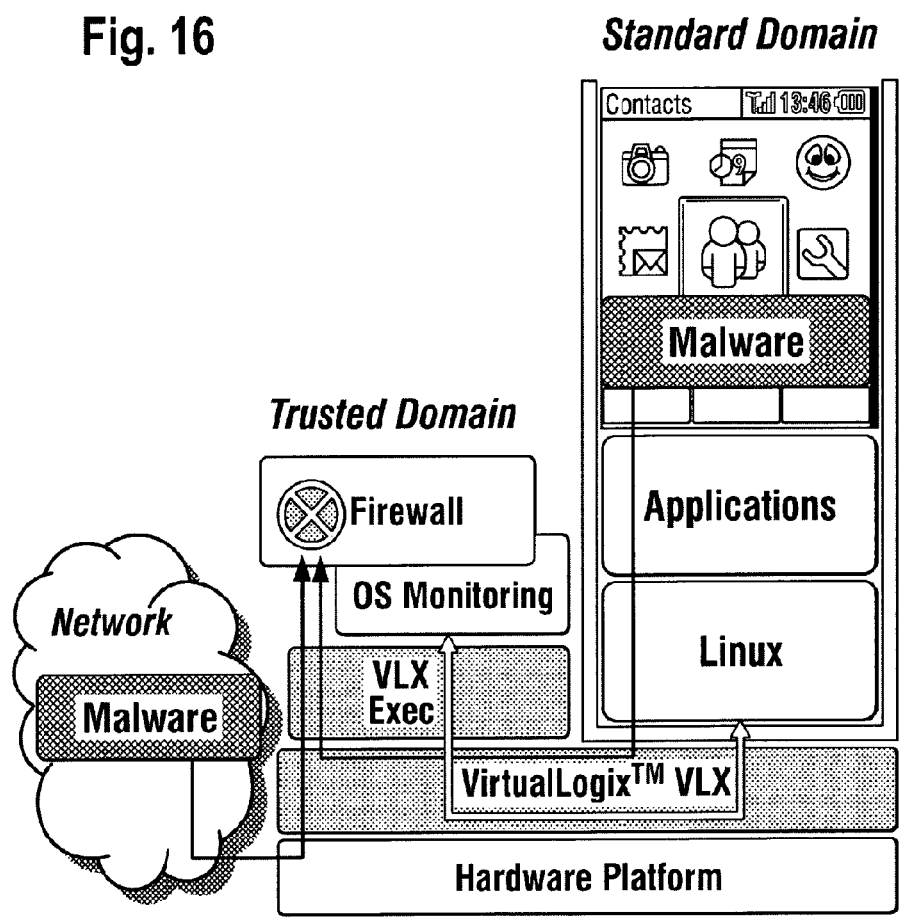
Figure 17:
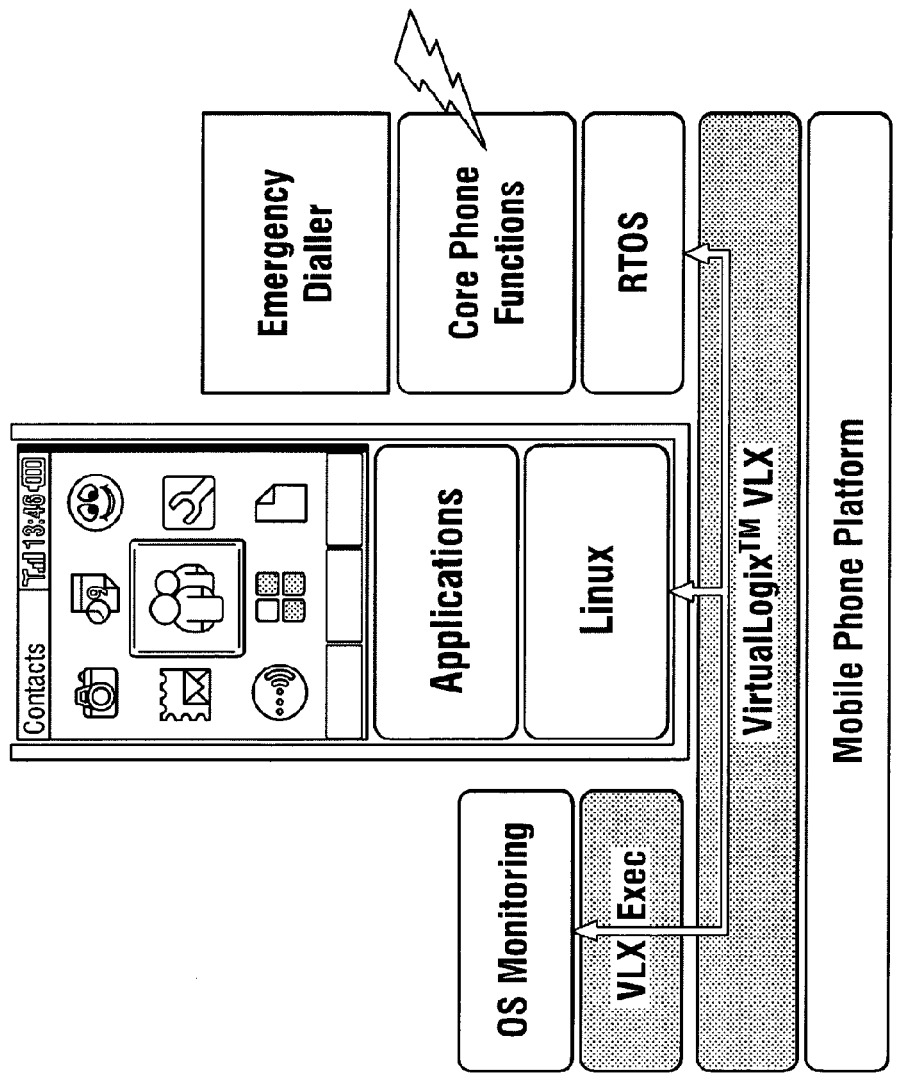

FIG. 16 illustrates a use case comprising a security firewall controlling network access from the trusted domain. This embodiment comprises the following features:

Network access is performed in a trusted partition running filtering software

Linux & QTopia Phone Edition run in a sandboxed container with no direct network access The firewall:

protects Linux/Applications from malware coming from the network prevents Linux/Applications malware from accessing the network System monitoring maintains continuity of service for voice when Linux foils.

"OS Monitoring" monitors Linux to check it is alive and not compromised

Figure 18:
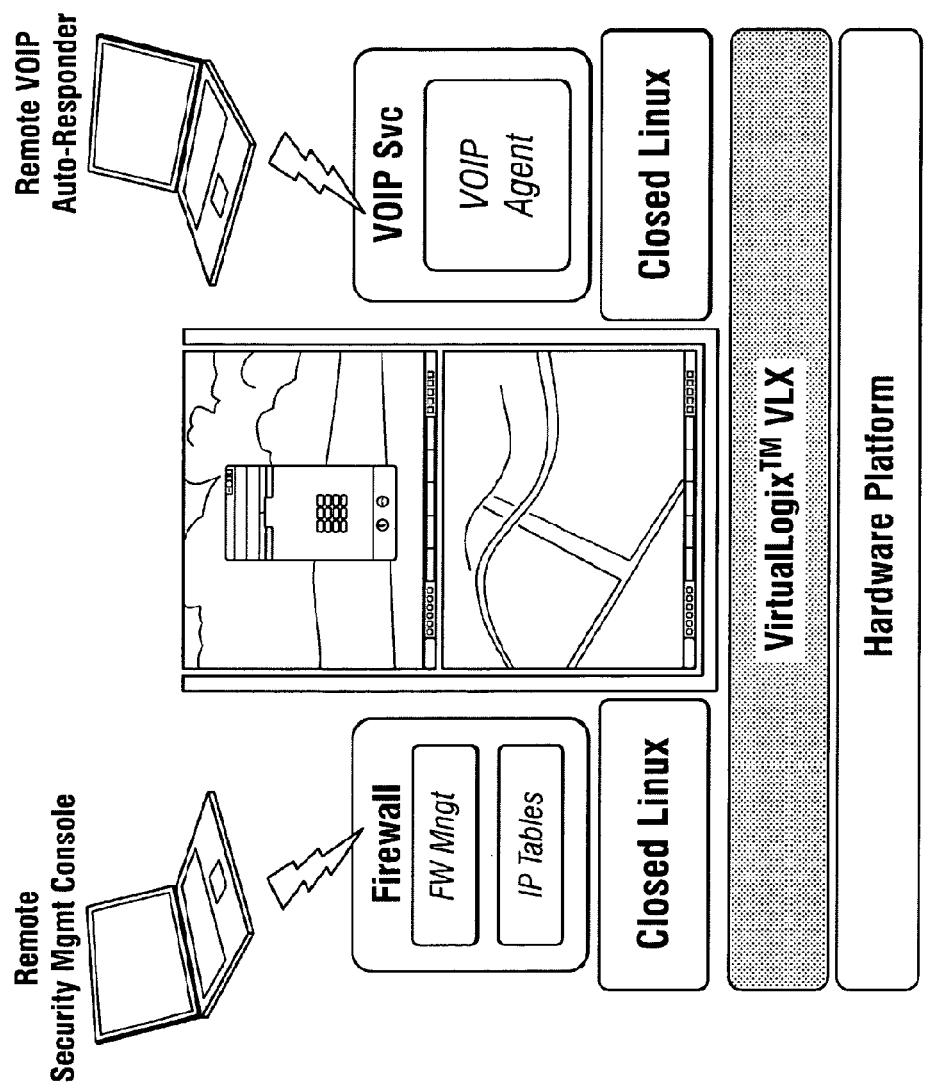
Figure 19:
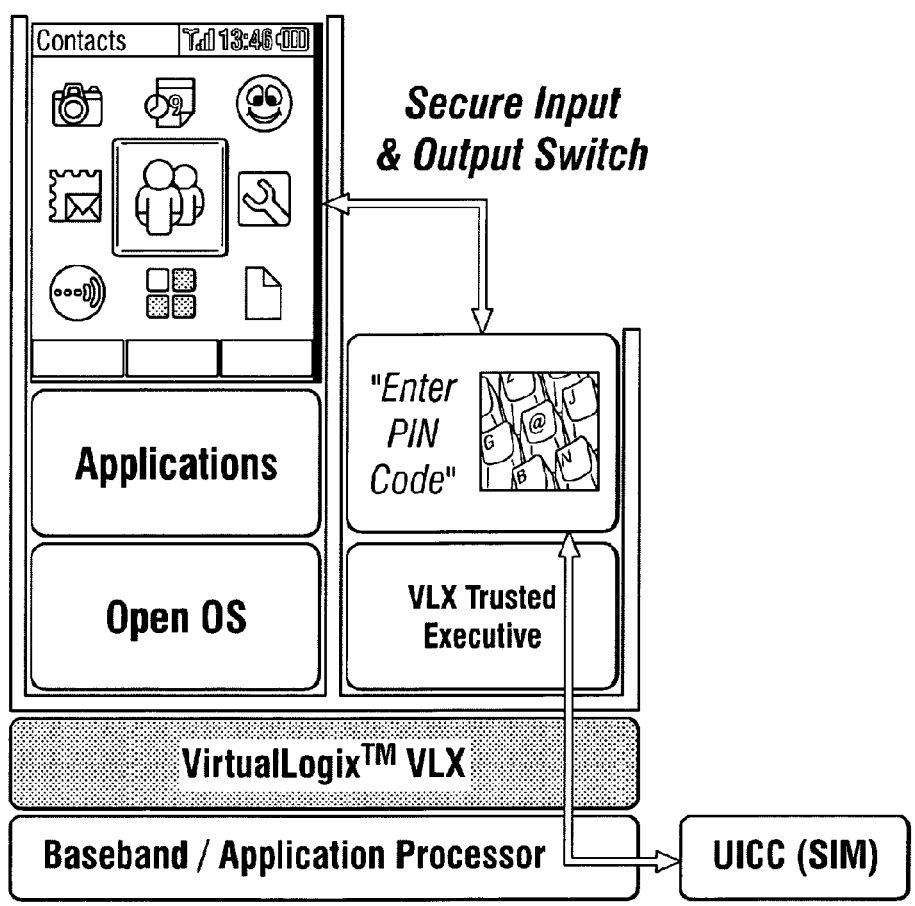

"OS Monitoring" restarts Linux automatically while RTOS still allows to receive & place voice calls through an emergency dialer "OS Monitoring" reports to Management Server and escalates when needed FIG. 18 illustrates a use case for providing VoIP and security firewall services from the trusted domain. This embodiment comprises the following features:

VoIP service agents run on a "Service OS" independent from the main "Application OS" to guarantee quality of service in case of Application OS over load or crash Security firewall services run on a "Service OS" (possibly different from the VoIP service) to protect both the device and the network from malware going to and coming from the device Security firewall is provisioned, configured and controlled from a Remote Security Management Console, independently from the user FIG. 19 illustrates a use case for providing for a secure interaction with a user from the trusted domain, for example in order to enter a PIN code.

Figure 20:
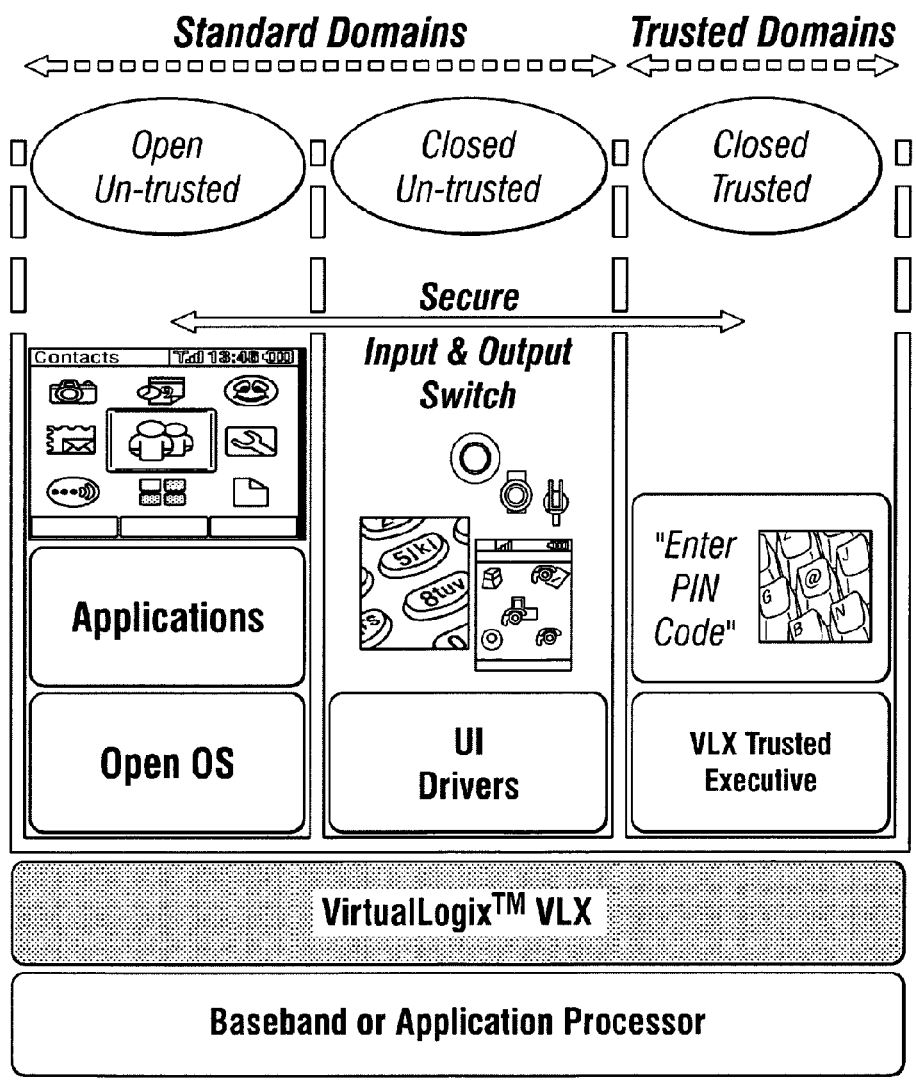

FIG. 20 illustrates a use case for secure user I/O switching between standard domains and the trusted domain.

Figure 21:
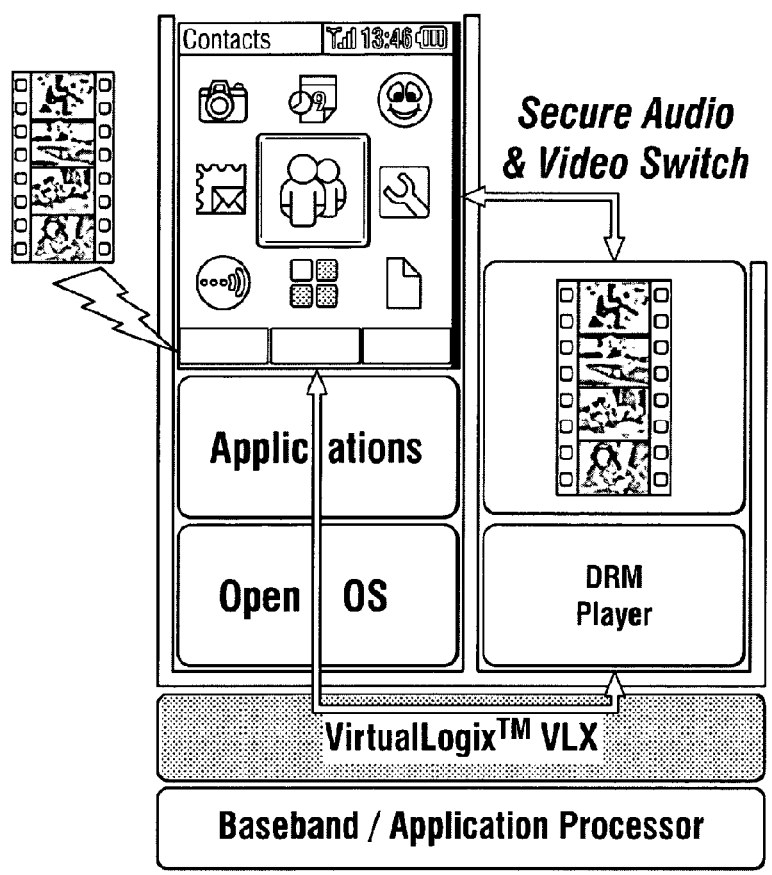

FIG. 21 illustrates a use case for displaying decoded DRM protected content in a closed partition, i.e. with no access to the network or storage.

Figure 22:
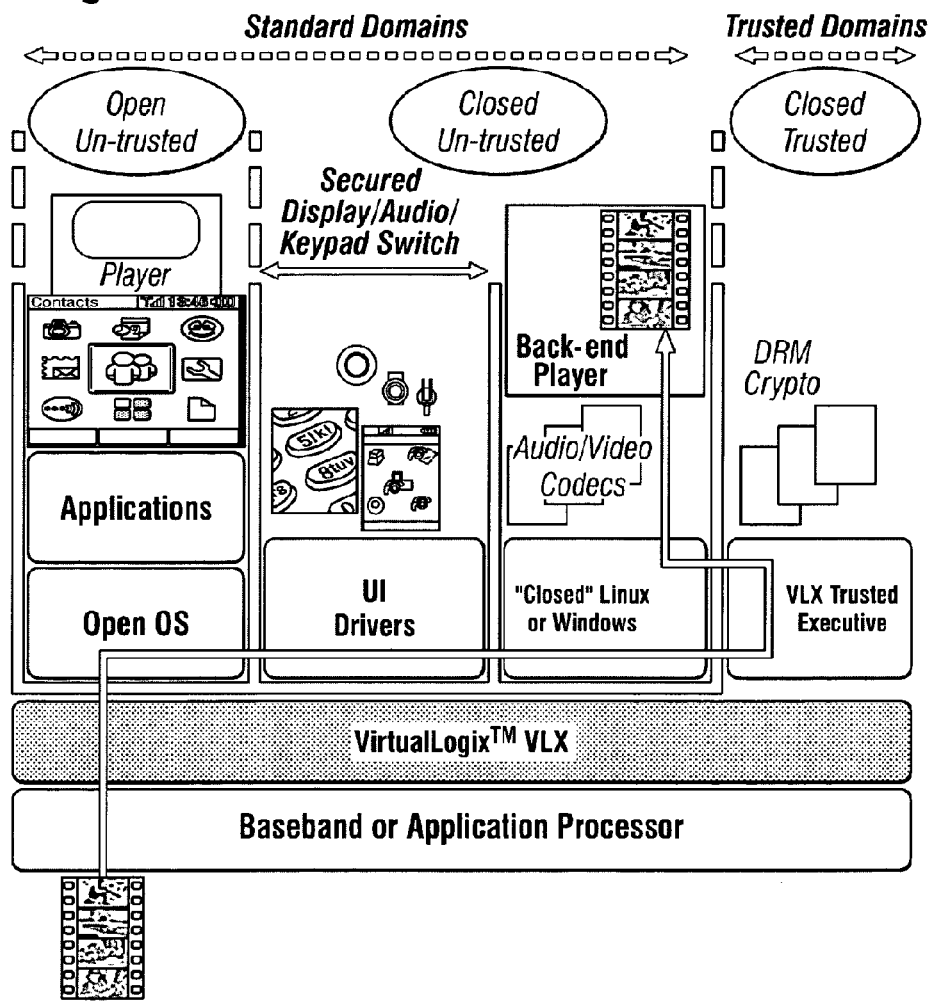

FIG. 22 illustrates a complete data path of DRM protected content before being played back to the user, using several partitions with different peripheral device access and trust execution level.

Figure 23:
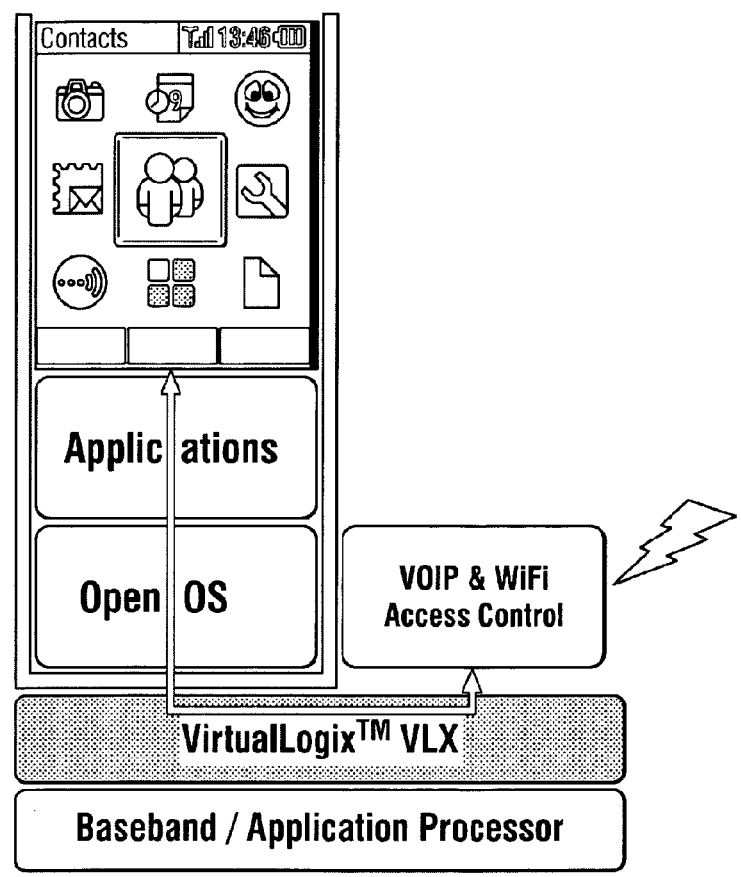

FIG. 23 illustrates a use case for controlling access to VoIP and WiFi services from the trusted domain.

Figure 24:
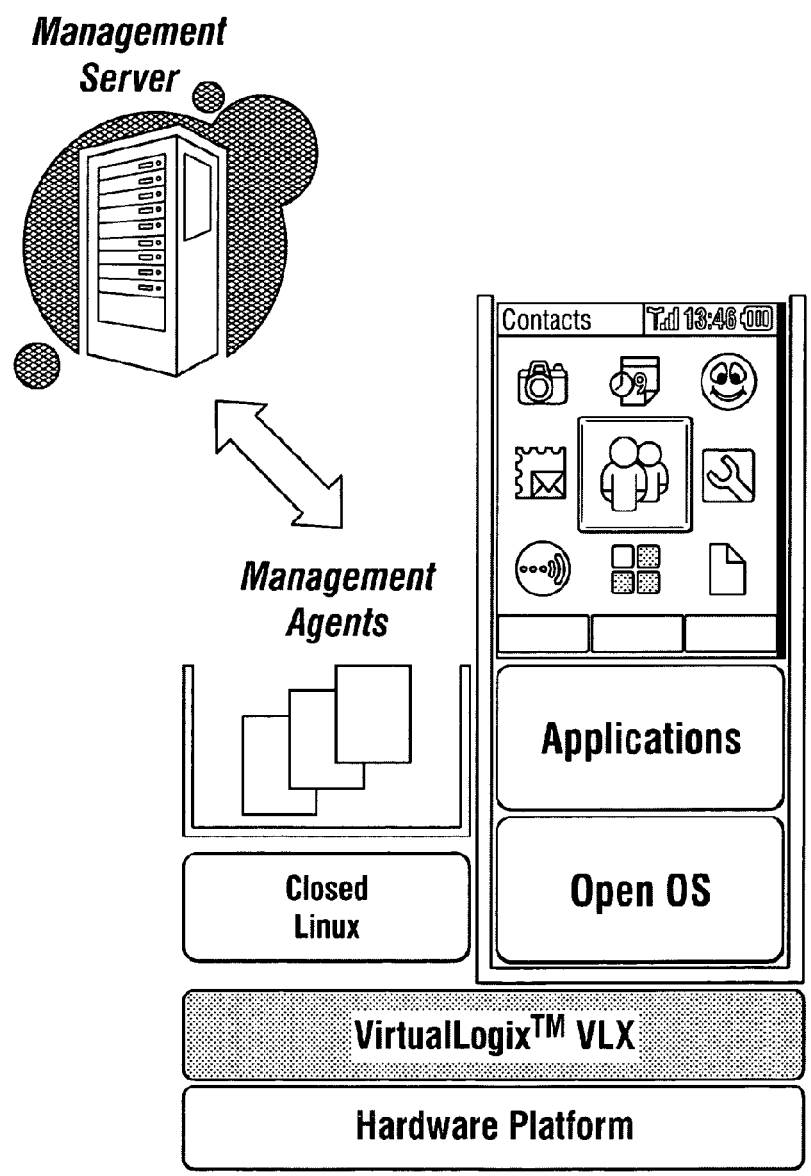
Figure 25:
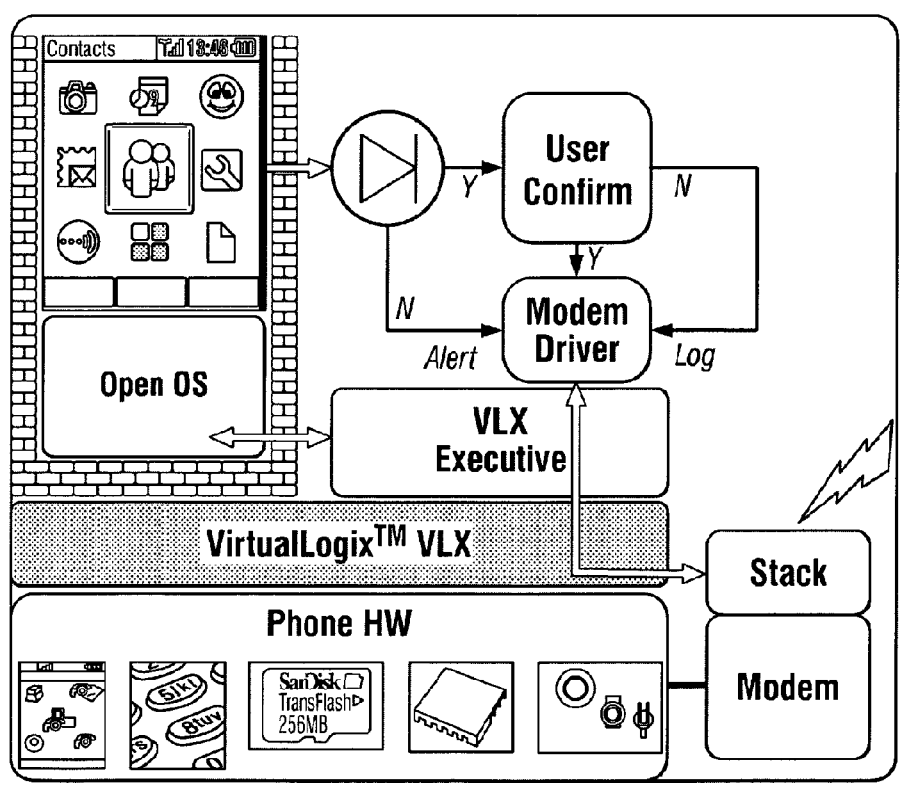

FIG. 24 illustrates a use case for managing the hardware/software platform from the trusted domain. This embodiment comprises the following features:

Management agents run in "trusted SW container", isolated from application OS:
  Monitoring & control of OS stacks: SW watchdog, "hot restart"
  Provisioning, configuration, reconfiguration
  updates, patching, OS upgrade with fall back to previous version in case of failure
  Incident handling and reporting to management server
  Secure authentication and operation of management functions
Management server interacts with management agents to
  Provision, configure, re-configure phone OS & application SW
  Insure proper security policy on the device FIG. 25 illustrates a use case for handling user prompts from the trusted domain. This embodiment comprises the following features:
  Calls/SMS originating from Linux applications are checked and confirmed by user securely
  Abuse is controlled and logged and alerts to the management server are generated.

In the following, the isolation provided by this secure architecture is described in more details in connection with DRM and SMS/call control.

DRM and SMS/Call Control

This embodiment of the invention resides in the separation of the trusted and standard ("open") domains of the mobile telephone architecture. An application running in the open domain may include the downloading of data subject to Digital Rights Management (DRM). However, operations to access the downloaded data may be performed in the trusted domain only. Thereby, the potential abuse of the downloaded data, for example by unauthorised copying, may be prevented. More particularly, the downloaded data may consist of digital images. Displaying the images may comprise switching the display screen from a screen controlled from within the open domain to a screen controlled from within the trusted domain. Upon termination of the image displaying, the screen control is switched back to the open domain. In this way, the image data is not stored in any cache or screen memory of the open domain (from which it could be copied in order to avoid DRM protection, for example).

In another embodiment, an application miming in the open domain of a mobile telephone may prompt the user to send a text message or initiate a telephone call, hi this case, control is passed from the open domain to the trusted domain to prompt the user of the mobile telephone to (manually) confirm the sending of the text message or the initiation of the telephone call. Thereby, the user can be protected from sending unwanted text messages or initiating unwanted telephone calls, or at least made aware of the costs associated with such text messages or calls.

In the trusted domain, a real time operating system (RTOS) and security agents perform core and security-related applications of the mobile telephone. In the open domain, an open operating system (open OS) runs user interactive applications, such as the downloading of video and audio data.

The virtualizer passes control between the open and the trusted domains, as shown, for example, in FIGS. 21, 22 and 25.

FIG. 21 illustrates the embodiment in which the control program passes control from the open domain to the trusted domain in order to display video data that has been downloaded by an application running in the open domain. In doing so, display control is switched from the open domain to the trusted domain. Upon termination of the display of the video data, display control is passed back to the open domain. As a consequence, the displayed video data is not contained in any screen memory or cache of the open domain (which may be accessed more easily), thus preventing unauthorised use of the data and DRM abuse.

FIG. 25 illustrates the embodiment in which the control program passes control from the open domain to the trusted domain in order to prompt the user to confirm the sending of a text message from within an interactive application running in the open domain. Thereby, the user is protected from unintentionally sending a text message generated by an application running in the open domain, or at least made aware of it and the costs of such action.

OTHER ASPECTS AND EMBODIMENTS

It will be clear from the forgoing that the above-described embodiments are only examples, and that other embodiments are possible and included within the scope of the invention as determined from the claims.

What is claimed is:

1. A data processing system comprising:
  at least one shared physical device configured to share access by one or more clients;
  at least one primary partition associated with the shared physical device, wherein a primary partition comprises a device driver configured to access the shared physical device, and a back end driver configured to access the device driver; and
  one or more secondary partitions, each comprising at least one of said clients and a front end driver configured to access the shared physical device via the at least one primary partition;
  wherein at least one of the one or more secondary partitions comprises a virtual device representing the physical device intended for access by a respective one of the clients; and
  wherein at least one of the one or more secondary partitions that comprise a virtual device comprises an isolator configured to prevent communications between the secondary partition and the primary partition except through the virtual device;
  wherein the isolator includes a bridge driver for preventing unauthorized access between the back end driver and the front end driver;
  wherein the isolator comprises software; and
  wherein the at least one of the one or more secondary partitions further comprises one or more applications that is in the same partition as said isolator, said one or more applications configured to access said shared physical device using said bridge driver and said back end driver when authorized.

2. The data processing system of claim 1, further comprising a virtualizer for dispatching hardware resources of the data processing system across the different types of partitions, thereby to provide an independent execution environment in each type of partition.

3. The data processing system of claim 2, wherein a number of the partitions form a trusted domain to which access is restricted, and a number of the partitions form at least one standard domain in which general purpose software is operable, wherein at least one of the isolators and the virtualizer are operated in the trusted domain, and at least one of the device and the front end drivers are operated in the standard domain.

4. The data processing system of claim 3, wherein in the trusted domain corresponds to a privileged execution mode, and the standard domain corresponds to non-privileged execution mode.

5. The data processing system of claim 3, comprising a plurality of protection rings, wherein the trusted domain corresponds to an execution mode in the most trusted protection ring.

6. The data processing system of claim 1, wherein one or more partitions comprises an isolator configured to prevent access to hardware resources by a client that is not authorized to have such access.

7. The data processing system of claim 6, wherein at least one isolator in a primary partition comprises a bridge driver for preventing access by at least one of the device driver and the back end driver to a front end driver to which no such access is authorized.

8. The data processing system of claim 1, wherein the back end driver provides for the implementation of one said virtual device for one or more clients.

9. The data processing system of claim 1, wherein at least one isolator comprises the bridge driver configured to prevent access to a back end driver by a front end driver not authorized to have such access.

10. The data processing system of claim 1, wherein at least one back end driver is arranged to switch between accesses to the physical device from different ones of said multiple clients.

11. The data processing system of claim 1, wherein at least one of said shared and dedicated devices include one or more of an input device, an output device, a storage device, and a networking device.

12. The data processing system of claim 1, wherein at least one partition of any type is associated with a user interface, and at least one other partition of any type is associated with an application or service, wherein the user interface partition and the application/service partition are arranged to interact with one another via Internet Web Services Protocols.

13. The data processing system of claim 1, further comprising:
a dedicated physical device for access by a single client only; and
a partition of a third type associated with the dedicated physical device, wherein a partition of the third type comprises said single client and a second device driver for accessing the dedicated physical device.

14. The data processing system of claim 1, wherein each isolator is configured to protect hardware resources not owned by the corresponding secondary partition from being accessed by software running within that secondary partition.

15. The data processing system of claim 1, wherein each isolator is arranged to operate at privileged CPU level and to run a guest operating system at non-privileged CPU level.

16. The data processing system of claim 15, wherein a kernel of each guest operating system is arranged to invoke isolator services in order to perform privileged operations.

17. The data processing system of claim 1, wherein the secondary partitions comprise different isolators.

18. The data processing system of claim 17, wherein the different isolators are arranged to run concurrently.

19. A method of operating a data processing system, the data processing system comprising a shared physical device for shared access by one or more clients, at least one primary partition associated with the shared physical device comprising a device driver and a back end driver, and one or more secondary partitions each comprising at least one of said clients, a front end driver, and a virtual device representing the physical device, wherein at least one of the secondary partitions that comprise a virtual device comprises an isolator for preventing communications between the secondary partitions and the primary partition except through the virtual device, the isolator including a bridge driver for preventing unauthorized access between the back end driver and the front end driver, wherein the isolator comprises software, the method comprising:
accessing the shared physical device by the front end driver in a secondary partition via the back end driver and the device driver in a primary partition;
at least one of:
(1) dispatching, with a virtualizer, hardware resources of the data processing system across the different types of partitions to provide an independent execution environment in each type of partition, and
(2) preventing access to hardware resources by a client that is not authorized to have such access by providing an isolator for at least one of the primary partitions and the secondary partitions;
forming a trusted domain with a number of the partitions and to which access is restricted, wherein at least one of the isolators and the virtualizer are operated in the trusted domain;
forming with a number of the partitions at least one standard domain in which general purpose software is operable, wherein at least one of the device and the front end drivers are operated in the standard domain;
executing a user application in the standard domain; and
executing in the trusted domain, at least one of a predetermined operation, service and function relating to the user application.

20. The method of claim 19, comprising controlling of I/O interfaces of the data processing system from within the trusted domain.

21. The method of claim 19, comprising operating a firewall in the trusted domain to protect the standard domain from unauthorized access.

22. The method of claim 19, comprising monitoring operation of a service application running in the standard domain which provides a service, and maintaining continuity of service by initiating an application in the trusted domain providing the same or a similar service in case of failure of the service application in the standard domain.

23. The method of claim 19, comprising passing control to the trusted domain to receive a password or code from the user requested by an operation running in the standard domain.

24. The method of claim 19, comprising: executing the application in the standard domain to download data subject to Digital Rights Management (DRM), and passing control to the trusted domain to permit access to the downloaded data.

25. The method of claim 19, comprising operating connected applications using technologies including at least one of 3G, WiFi and WiMAX in the standard domain, and controlling connection access from within the trusted domain.

26. The method of claim 19, comprising operating one or more management agents in the trusted domain, wherein the management agents are adapted to interact with a management server, thereby to manage at least one of a general operating system and the application running in the standard domain, including at least one of providing, configuring, updating, monitoring, restarting at least one of the general operating system and the application running in the standard domain, secure user authentication, and incident handling and reporting to the management server.

27. The method of claim 19, wherein the data processing system is a mobile communications device, in particular a mobile telephone.

28. The method of claim 27, further comprising: passing control to the trusted domain to request confirmation by a user of the mobile communications device of the sending of a text message or the initiation of a telephone call triggered by an application running in the standard domain.

29. The method of claim 28, further comprising displaying to the user the costs associated with the sending of a text message or the initiation of a telephone call before requesting confirmation by the user.

30. The method of claim 19, wherein the data processing system comprises a dedicated physical device for access by a single client only, and a partition of a third type associated with the dedicated physical device comprising said single client and a second device driver, the method comprising accessing the dedicated physical device by the second device driver in the third type partition.

\* \* \* \* \*